United States Patent
Ger et al.

(10) Patent No.: US 7,830,099 B2
(45) Date of Patent: Nov. 9, 2010

(54) SYSTEM FOR DRIVING A PLURALITY OF LAMPS

(75) Inventors: Chih-Chan Ger, Hsinchu (TW); Chi-Chang Lu, Hsinchu (TW); Chia-Kun Chen, Hsinchu (TW)

(73) Assignees: Ampower Technology Co., Ltd., Jhongli, Taoyuan County (TW); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 367 days.

(21) Appl. No.: 12/011,886

(22) Filed: Jan. 30, 2008

(65) Prior Publication Data

US 2008/0129300 A1 Jun. 5, 2008

Related U.S. Application Data

(63) Continuation-in-part of application No. 11/308,745, filed on Apr. 28, 2006, now Pat. No. 7,362,103.

(30) Foreign Application Priority Data

Dec. 31, 2007 (TW) .............................. 96151106 A

(51) Int. Cl.
G05F 1/00 (2006.01)
(52) U.S. Cl. ...................... 315/291; 315/224; 315/277; 315/324; 324/529; 324/522
(58) Field of Classification Search ................. 315/282, 315/276–278, 224, 291, 312, 324, 325, 209 R, 315/220, DIG. 7; 324/522, 529, 536
See application file for complete search history.

(56) References Cited

U.S. PATENT DOCUMENTS

| | | | |
|---|---|---|---|
| 6,856,096 B1 * | 2/2005 | Choudhury | 315/119 |
| 6,960,891 B2 | 11/2005 | Park et al. | |
| 7,061,183 B1 * | 6/2006 | Ball | 315/57 |
| 7,173,382 B2 * | 2/2007 | Ball | 315/282 |
| 7,242,147 B2 * | 7/2007 | Jin | 315/177 |
| 7,294,971 B2 * | 11/2007 | Jin | 315/177 |
| 7,362,103 B2 * | 4/2008 | Ger et al. | 324/414 |
| 2006/0197466 A1 | 9/2006 | Park | |

OTHER PUBLICATIONS

Tsu-Chiang Mi et al., U.S. Appl. No. 12/650,448,"System for driving a plurality of lamps", dated Dec. 30, 2009.*

* cited by examiner

Primary Examiner—Haissa Philogene
(74) Attorney, Agent, or Firm—Frank R. Niranjan

(57) ABSTRACT

A system for driving a plurality of lamps comprises a lamp module, an inverter circuit providing currents to the lamp module, an interface for conveying the currents, a splitter, a balance unit, and a fault detecting circuit. The splitter receives the currents provided by the inverter circuit through the interface and distributing the currents to the plurality of lamps. The balance unit balances the currents provided to the plurality of lamps in the lamp module. The fault detecting circuit detects and reports a condition of at least one of the lamps by detecting signals generated from the inverter circuit. The fault detecting circuit receives the signal from a point in the system, such that the fault detecting circuit can detects the signals before the signal undergoes the distributing by the splitter.

25 Claims, 30 Drawing Sheets

SYSTEM FOR DRIVING A PLURALITY OF LAMPS

CROSS-REFERENCE TO RELATED APPLICATIONS

This application is a Continuation-In-Part of U.S. application Ser. No. 11/308,745, entitled "SYSTEM FOR DRIVING A PLURALITY OF LAMPS AND FAULT DETECTING CIRCUIT THEREOF", filed on Apr. 28, 2006 now U.S. Pat. No. 7,362,103.

BACKGROUND

1. Field of the Invention

The invention relates to a backlight device, and particularly to a system for driving a plurality of lamps used in backlight modules of liquid crystal displays.

2. Description of Related Art

Discharge Lamps, especially Cold Cathode Fluorescent Lamps (CCFLs), are used as light sources for liquid crystal display (LCD) panels. Typically, the CCFLs are driven by a plurality of inverter circuits. An inverter circuit provides alternating current (AC) signals to the CCFLs.

For large-size LCD panels, two or more CCFLs are typically required to provide sufficient luminance. The inverter circuit employed by the large-size LCD panels accordingly includes a plurality of outputs to respectively provide AC signals to each CCFL. When a short-circuit or break causes a fault on any output of the inverter circuit and a corresponding CCFL fails, the LCD panel loses its luminance symmetry. Due to lack of fault detection capabilities on the inverter outputs, the backlight inverter circuit fails to provide proper protection functions when faults occur.

Additionally, faults or abnormalities may occur in lamps or other elements and affect the entire display system. For example, if a lamp breaks, the resulting open circuit stops current flow therethrough. Impedance in a lamp, however, may also change with its age and affect operation and luminance thereof. That is, based on backlight use, some lamps may age and gradually go unqualified. As more lamps are employed in a display as backlights, impact of lamp failure to the system electric characteristics (e.g. voltage and/or current) become less perceptible, which makes lamp abnormality detection more difficult. Further, voltage and current required to drive a discharge lamp varies with impedance thereof, which changes not only with age of the lamp but also the states of the lamp. For example, voltage required to start up a discharge lamp from its off state is higher than needed to drive the discharge in the on state. Thus, detecting lamp abnormalities by comparing electric characteristic thereof with a static threshold value may be unreasonable. This further complicates fault detection on lamps.

SUMMARY

An exemplary embodiment of the system for driving a plurality of lamps in a lamp module comprises an inverter circuit providing power, an interface for conveying power, a splitter, a balance unit, and a fault detecting circuit. The inverter circuit provides power through the interface to the lamps. The splitter receives the power provided by the inverter circuit through the interface and distributes the power to the plurality of lamps. The balance unit balances the current provided to the plurality of lamps in the lamp module. The fault detecting circuit detects and reports a condition of at least one of the lamps by detecting signals generated from the inverter circuit. The fault detecting circuit is connected to the inverter circuit, such that the fault detecting circuit can detects the signals before the signal undergoes distribution by the splitter.

Other advantages and novel features of the present invention will become more apparent from the following detailed description of preferred embodiment when taken in conjunction with the accompanying drawings, in which:

DETAILED DESCRIPTION OF THE EMBODIMENTS

System Overview

Figure 1:
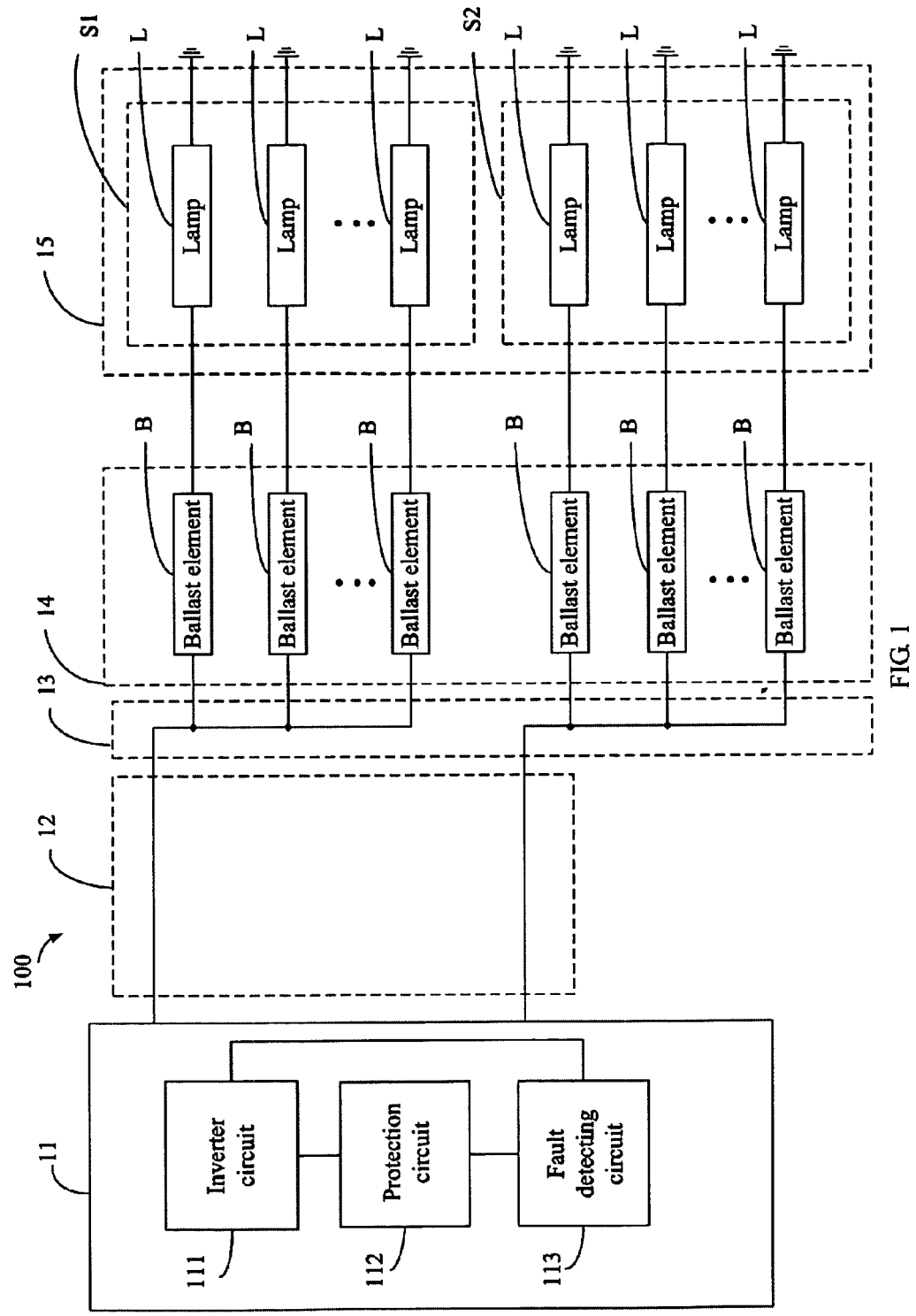
FIG. 1 is a block diagram showing an exemplary embodiment of a system for driving a plurality of lamps.

FIG. 1 shows an exemplary configuration of a backlight assembly 100 which may be utilized in a display, such as a liquid crystal display (LCD). A power supply 11 provides power (such as AC signals) to a lamp module 15 through an interface 12, a splitter 13, and a balance unit 14. The lamp module 15 comprises a plurality of lamps L that may comprise CCFLs or other discharge lamps. The power supply 11 comprises an inverter circuit 111 for generating power to drive the lamp module 15 and ensuring lamps L therein constantly remain on. A fault detecting circuit 113 monitors and reports a condition of at least one of the lamps L to a protection circuit 112 by detecting signals generated by the inverter circuit 111, such that the protection circuit 112 may accordingly protect the backlight assembly 100, such as cutting off the inverter circuit 111 or triggering prompting of a warning message or alarm.

Figure 2:
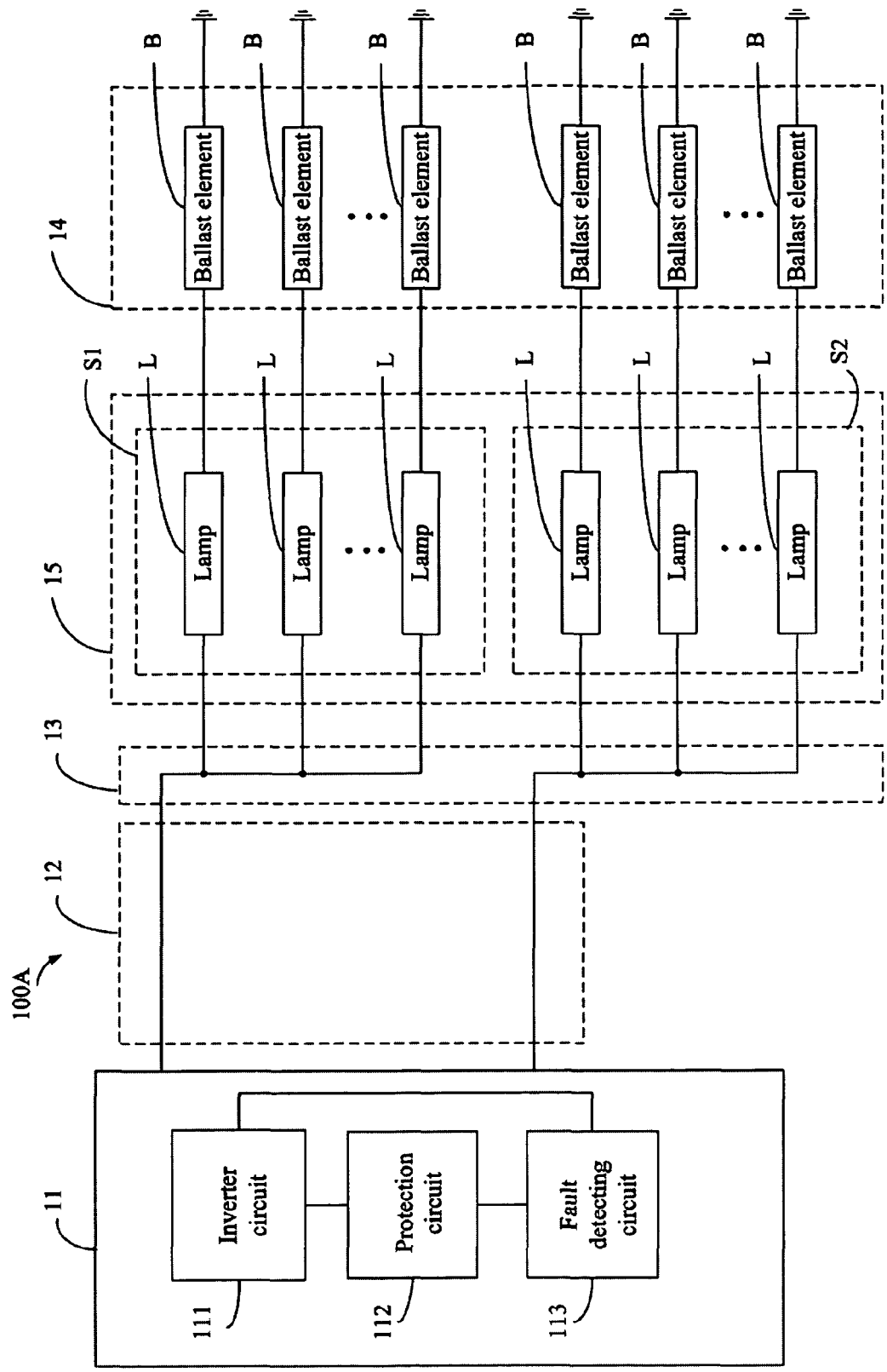
FIG. 2 is a block diagram showing a block diagram of another exemplary configuration of the system for driving a plurality of lamps.

The interface 12 may comprise one or more high voltage tolerable wired lines, buses, or others for conveying power from the power supply 11 to the splitter 13. The splitter 13 receives the power provided by the inverter circuit 111 of the power supply 11 through the interface 12 and distributes the power to the plurality of lamps L of the lamp module 15. The balance unit 14 comprises a plurality of ballast elements B for respectively balancing currents flowing through the lamps L. Each ballast element B may comprise a capacitor, inductor or other components. In other embodiments, configuration of the backlight assembly 100, especially the connection between the splitter 13, the balance unit 14, and the lamp module 15, may be changed. FIG. 2 shows an exemplary configuration of another backlight assembly 100A.

Ages, as well as faults occurred on the lamps L may change overall electrical characteristic of the lamp module 15 and the backlight assembly 100. Minor affects of age and/or status on the impedance of each lamp L are common factors varying in unison among all lamps, and thus should be disregarded by fault detections, which can be done, for example, by grouping lamps L into two or more sets, and comparing electrical characteristics associated with these sets.

The fault detecting circuit 113 may detect a condition of at least one of the lamps L by detecting signals generated from one or more transformers in the inverter circuit 111 before the signals are distributed by the splitter 13. That is, the signals may be extracted and detected by the fault detecting circuit 113 before being transmitted to the splitter 13. The splitter 13 may be made up of conductor, a bus, circuit, or any electronic component with its outputs more than inputs thereof.

The inverter circuit 111 may generate two driving signals to drive corresponding two sets of lamps L (such as sets S1 and S2 of FIG. 1). In an exemplary embodiment, the inverter circuit 111 may generate two driving signals (of same polarity or opposite polarity) and transmit these two driving signals respectively through a path 121 and a path 122 of the interface 12, and the splitter 13 to the lamp module 15. For example, the inverter circuit 111 generates two driving signals with the same polarity by synchronizing amplitudes and phases of these two driving signals at the same time t (wherein t is a time variable). It is preferable that these two driving signals are of opposite polarity. For example, these two driving signals can be simultaneously generated by the inverter circuit 111 at time t with same amplitudes and opposite phases, thus providing opposite polarity. It should be noted that the two driving signals with same polarity or opposite polarity may comprise same or different amplitudes at the same time t. The two driving signals may be generated to respectively drive two sets of lamps L, such as sets S1 and S2, in the lamp module 15. One lamp L may vary in impedance when suffering a fault, and thus a change in the signal of driving the lamp is generated. The fault detecting circuit 113 is provided for detecting the change caused by the lamp with reference to the other driving signal, and reports the abnormal condition or faults of the lamp. Note that the number of lamps in one set may be equal to or different from that in the other set. Lamps L in the lamp module 15 may be grouped in two or more sets for respectively receiving the driving signals.

Figure 3:
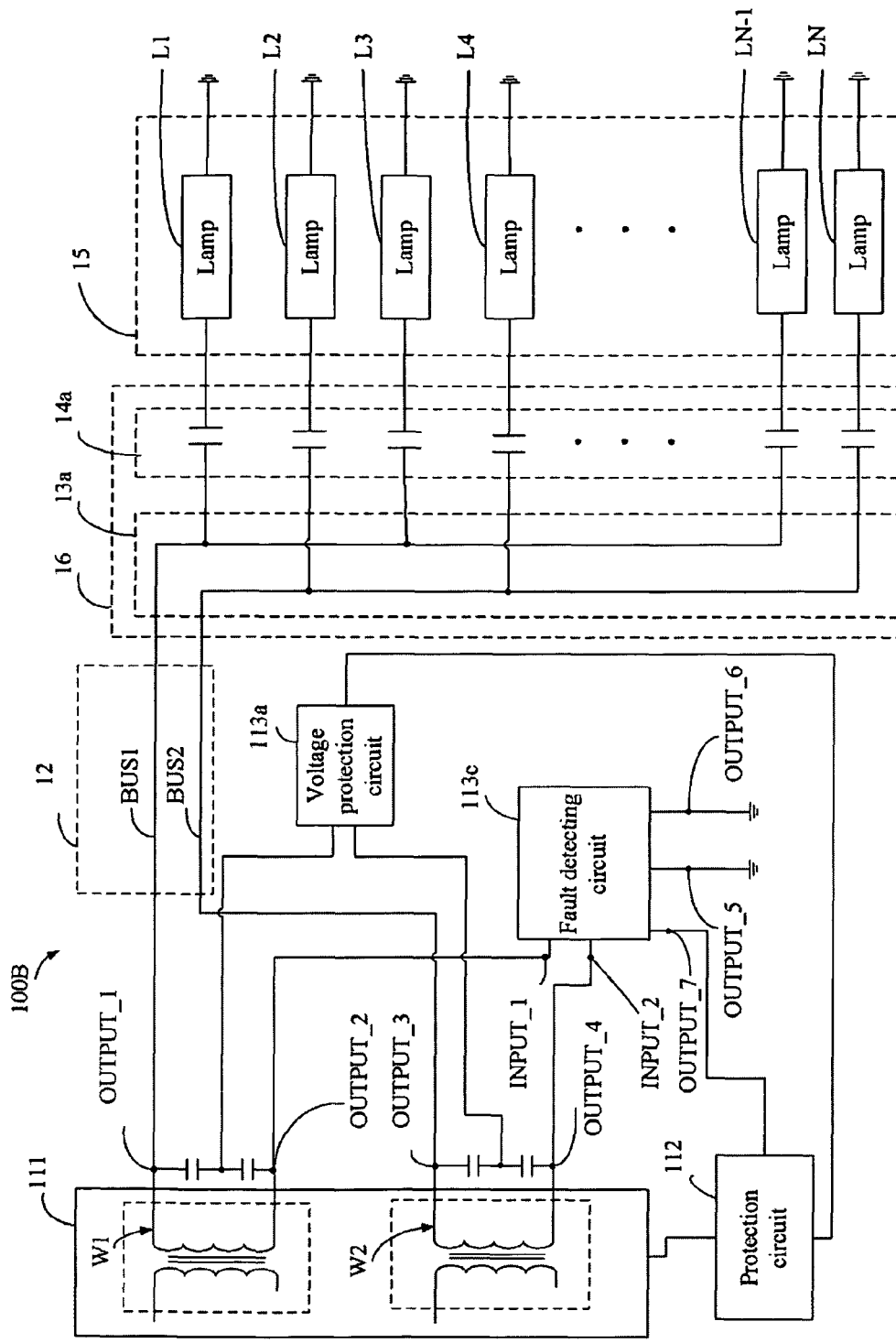
FIG. 3 is a block diagram showing an exemplary embodiment of a backlight system in FIG. 1.

FIG. 3 shows another system 100B as another exemplary embodiment of the system 100 in FIG. 1. A balance unit 14a is an embodiment of the balance unit 14 and comprises capacitors as ballast elements for respectively connecting to lamps, as shown in FIG. 3. In FIG. 3, the inverter circuit 111 comprises two secondary windings W1 and W2 of one or more transformers and outputs AC current as driving signals through high voltage ends OUTPUT_1 and OUTPUT_3 to respectively drive odd-numbered and even-numbered lamps in the lamp module 15. Since each winding comprises two ends, one of the ends outputting relatively high voltage than the other is referred to as a high voltage end while the other end is referred to as a low voltage end. In the exemplary embodiment, the fault detecting circuit 113c receives and detects the driving signals from low voltage ends OUTPUT_2 and OUTPUT_4 of the secondary windings W1 and W2. The driving signals received from the low voltage ends OUTPUT_2 and OUTPUT_4 are preferably of but not limited to opposite polarity. A fault detecting circuit 113c detects difference between the received signals, thus detecting lamp faults. An abnormal voltage protection unit 113a detects abnormal voltage and reports the same to the protection unit 112. When receiving the abnormal voltage report, the protection unit 112 accordingly protects the inverter circuit 111. A fault detecting circuit 113c detects current abnormalities and reports the same to the protection unit 112. When receiving the current abnormality report, the protection unit 112 also protects the inverter circuit 111.

A splitter 13a and a balance unit 14a are respectively exemplary embodiments of the splitter 13 and the balance unit 14. In practical application, the splitter 13a and the balance unit 14a are integrated on a balancing circuit board 16.

Figure 4:
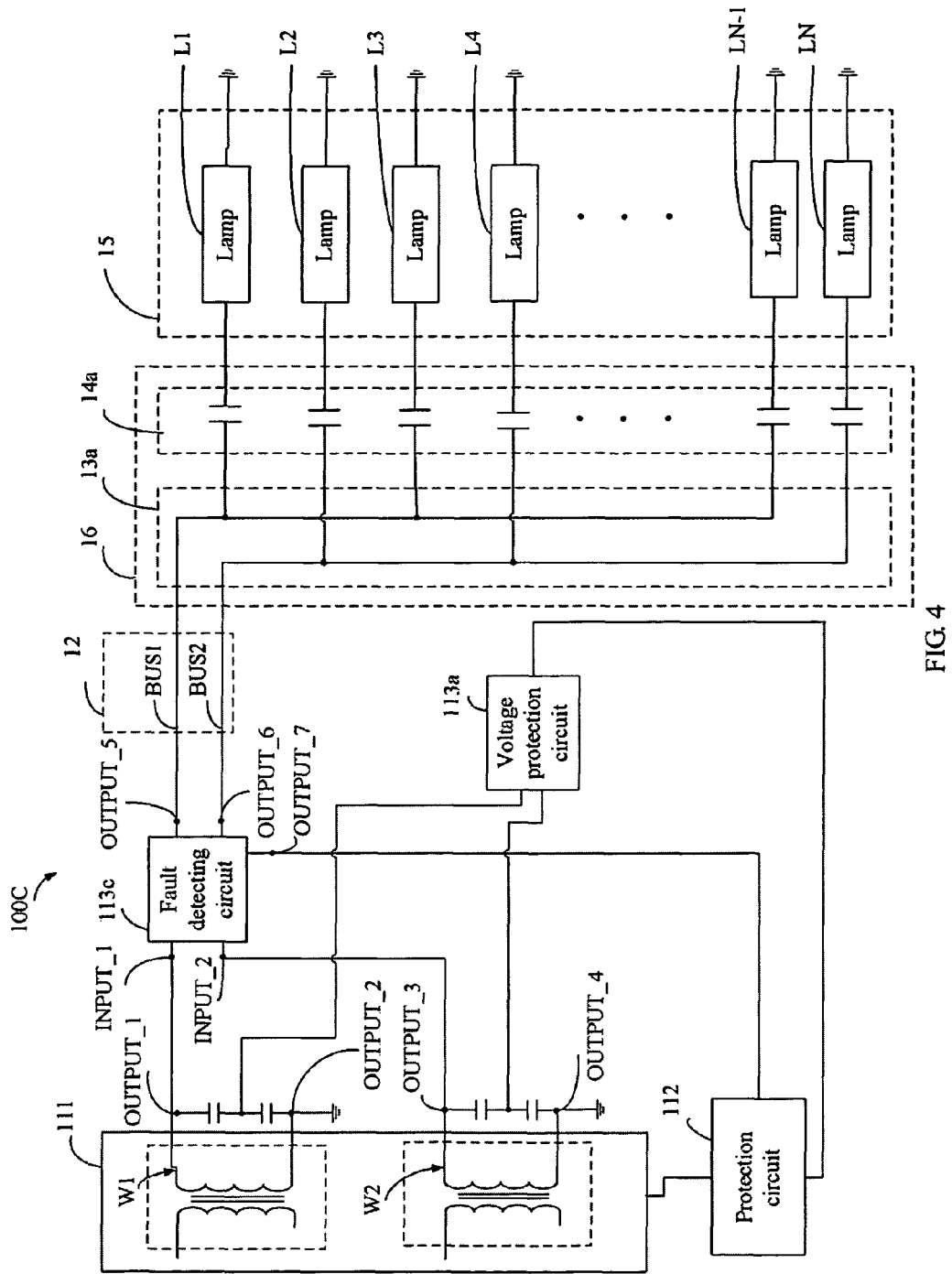
FIG. 4 is a block diagram showing another exemplary embodiment of a backlight system in FIG. 1.

FIG. 4 shows a system 100c as another exemplary embodiment of the system 100 in FIG. 1. In the exemplary embodiment, the fault detecting circuit 113c receives and detects the driving signals from the high voltage ends OUTPUT_1 and OUTPUT_3 of the secondary windings W1 and W2. The fault detecting circuit 113c may be connected between the inverter circuit 111 and the interface 12 but is not limited thereto. For example, the fault detecting circuit 113c may be connected between two segments of the interface 12 or between the interface 12 and the splitter 13. The fault detecting circuit 113c may extract the driving signals from the interface 12. The driving signals received from the high voltage ends OUTPUT_1 and OUTPUT_3 are preferably of opposite polarity, but are not limited thereto. The fault detecting circuit 113c detects difference between the received signals, and thus detects lamp faults.

Exemplary Fault Detecting Circuit

Figure 5:
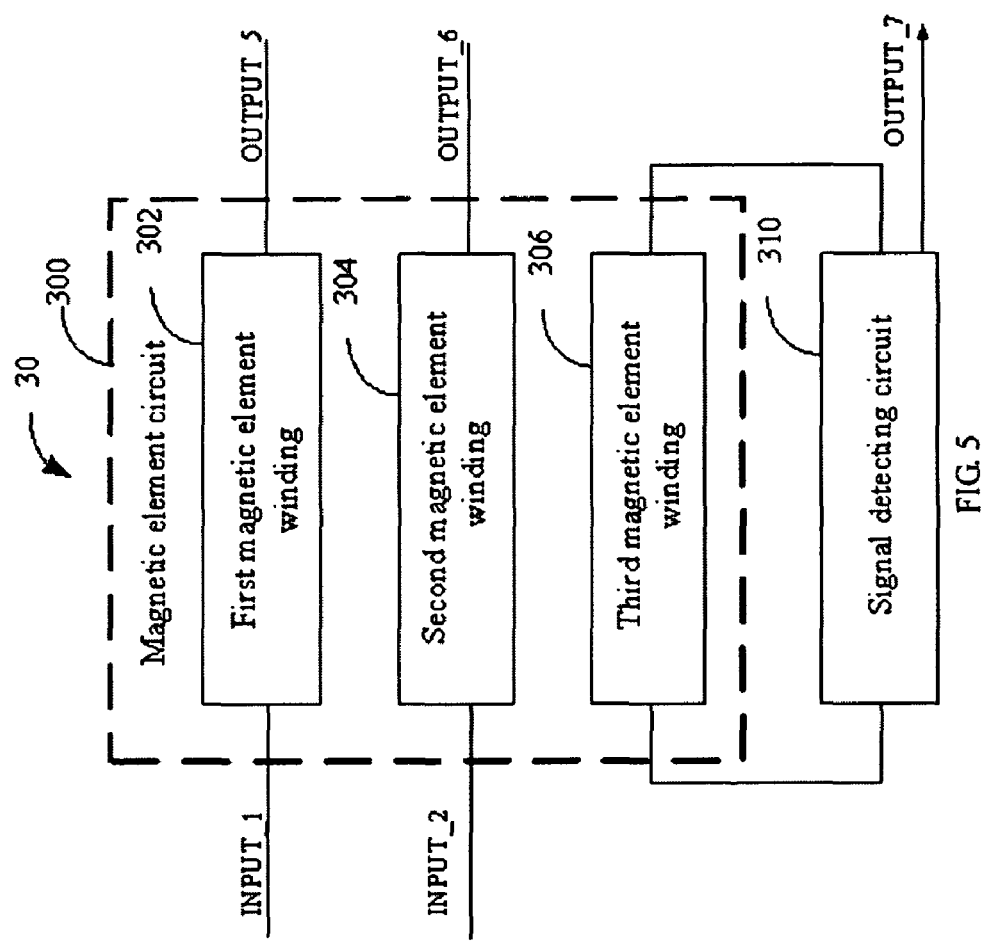
FIG. 5 is a block diagram of an exemplary embodiment of the fault detecting circuit $113c$ in FIG. 3.

FIG. 5 is a block diagram of an exemplary embodiment of the fault detecting circuit 113c. The fault detecting circuit 30 includes a magnetic element circuit 300 and a signal detecting circuit 310. The magnetic element circuit 300 is connected to inputs INPUT_1 and INPUT_2 and outputs OUTPUT_5 and OUTPUT_6. When a lamp fault causes one or more of the driving signals to change, flux in the magnetic element circuit 300 also changes, and the magnetic element circuit 300 subsequently generates an induction signal based on the changed flux. The signal detecting circuit 310 generates a fault signal according to the induction signal generated by the magnetic element circuit 300, and sends the fault signal to the protection circuit 112.

In the exemplary embodiment, the magnetic element circuit 300 may comprise a first magnetic element winding 302, a second magnetic element winding 304, and a third magnetic element winding 306. Note that the magnetic element circuit 300 may comprise more than three windings, one for detecting flux changes and the others for respectively conveying driving signals to lamp sets and generating flux. Each winding may comprise a single coil or a plurality of coil connected in series. The windings 302, 304, and 306 may be coupled through a magnetic core or not. The first magnetic element winding 302 is connected between the input INPUT_1 and the output OUTPUT_5, and the second magnetic element winding 304 is connected between the input INPUT_2 and the output OUTPUT_6. The third magnetic element winding 306 generates the induction signal if a detectable flux change occurs in the magnetic element circuit 300. In this embodiment, the induction signal is recognized as change in current.

A winding ratio between the first magnetic element winding 302 and the second magnetic element winding 304 is designed such that fluxes on the winding 306 generated by the windings 302 and 304 can substantially counteract each other or be canceled when no lamp fault occurs. Similarly, the magnetic element circuit 300 may comprise more than two windings for conveying driving signals, and the winding ratio thereof is designed to cancel flux on the winding 306 generated by the signal conveying windings when no lamp fault occurs. In this embodiment, a winding ratio between the first magnetic element winding 302 and the second magnetic element winding 304 is reverse to a ratio between amplitude of a portion of the driving signals provided to the lamp set S1 and amplitude of another portion of the driving signals provided to the lamp set S2 at a same time t (where t is a time variable). In other words, the winding ratio between the first magnetic element winding 302 and the second magnetic element winding 304 is substantially in proportion to a ratio between the total impedance of the lamp set S1 and the total impedance of the lamp set S2. Specifically, the winding ratio between the first magnetic element winding 302 and the second magnetic element winding 304 is substantially opposite a ratio between current provided by the inverter circuit to the lamp set S1 and current provided by the inverter circuit to the lamp set S2. For example, if the total current provided to the lamp set S1 is I1, and the total current provided to lamp set S2 is I2, the ratio between the first magnetic element winding 302 and the second magnetic element winding 304 is substantially I2:I1. Because the third magnetic element winding 306 may affect the intensity of the induction signal, the third magnetic element winding 306 is chosen according to the characteristics needed to provide the proper sensitivity to flux changes whereby the signal detecting circuit 310 can detect faults of a lamp L without mistake.

Figure 6A:
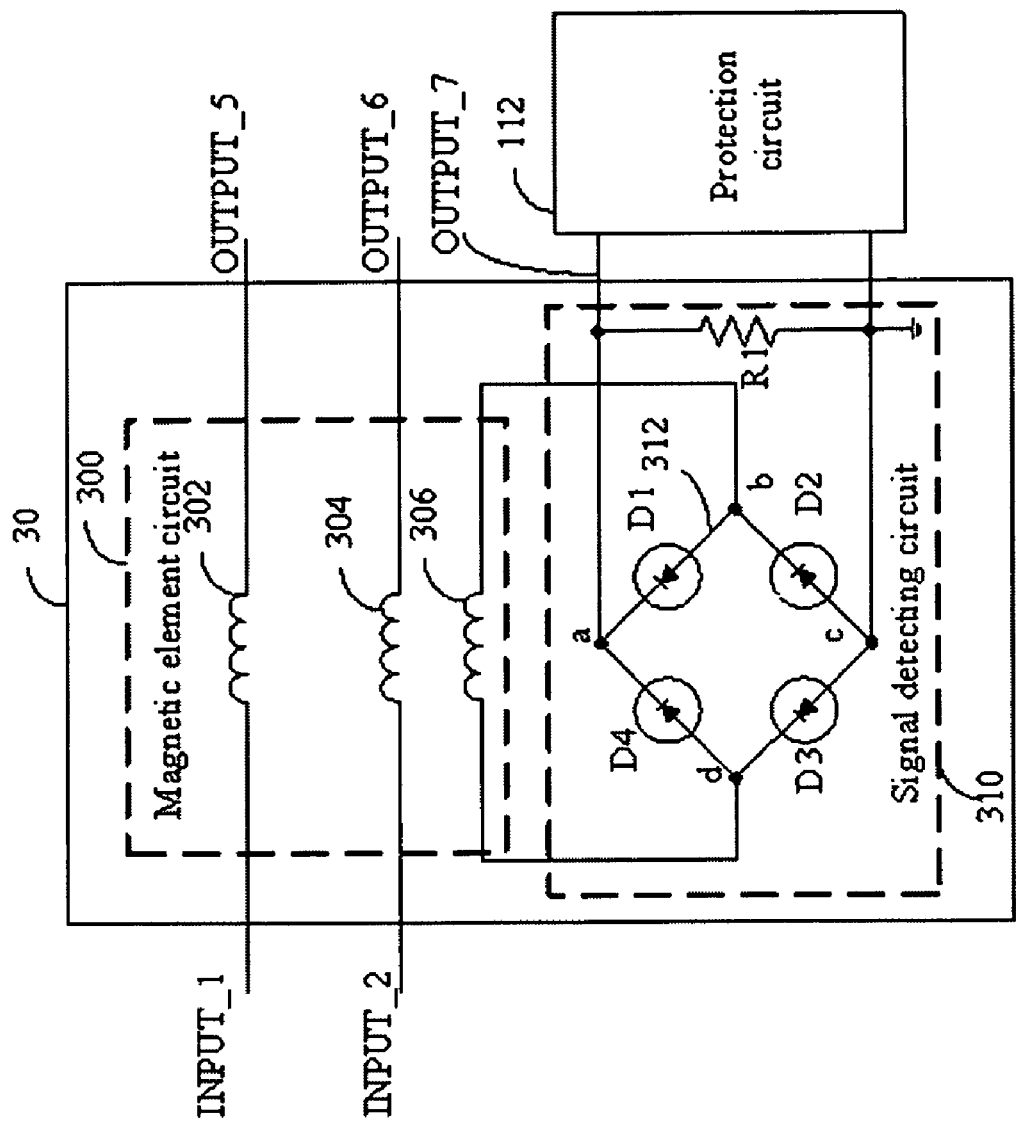
FIG. 6A is an exemplary circuit diagram of a fault detecting circuit utilizing four diodes as a rectifier circuit.

FIG. 6A is an exemplary circuit diagram of the fault detecting circuit 30 of FIG. 5. Note that in FIG. 6A and other drawings, electronic components of the same type such as the type of capacitors, resistors, diodes, windings, or magnetic cores are shown in similar representations. Accordingly, details of respective representations are omitted. The signal detecting circuit 310 may comprise a rectifier circuit 312 and a resistor R1. The rectifier circuit 312 includes four nodes a, b, c, and d. The nodes a and c are opposite to each other, and the nodes b and d are opposite to each other. The nodes b and d are respectively connected to the two ends of the third magnetic element winding 306. The resistor R1 is connected between the nodes a and c, and the node c is grounded. The two ends of the resistor R1 are also connected to the protecting circuit 112. The rectifier circuit 312 includes four diodes D1, D2, D3, and D4. The cathode of the diode D1 is connected to the node a, and the anode of the diode D1 is connected to the node b. The cathode of the diode D2 is connected to the node b, and the anode of the diode D2 is connected to the node c. The cathode of the diode D3 is connected to the node d, and the anode of the diode D3 is connected to node c. The cathode of the diode D4 is connected to the node a, and the anode of the diode D4 is connected to the node d. In alternative embodiments of the invention, the rectifier 312 may comprise other switching elements. In this preferred embodiments, the induction signal is a current signal converted to a voltage signal by R1.

Figure 6B:
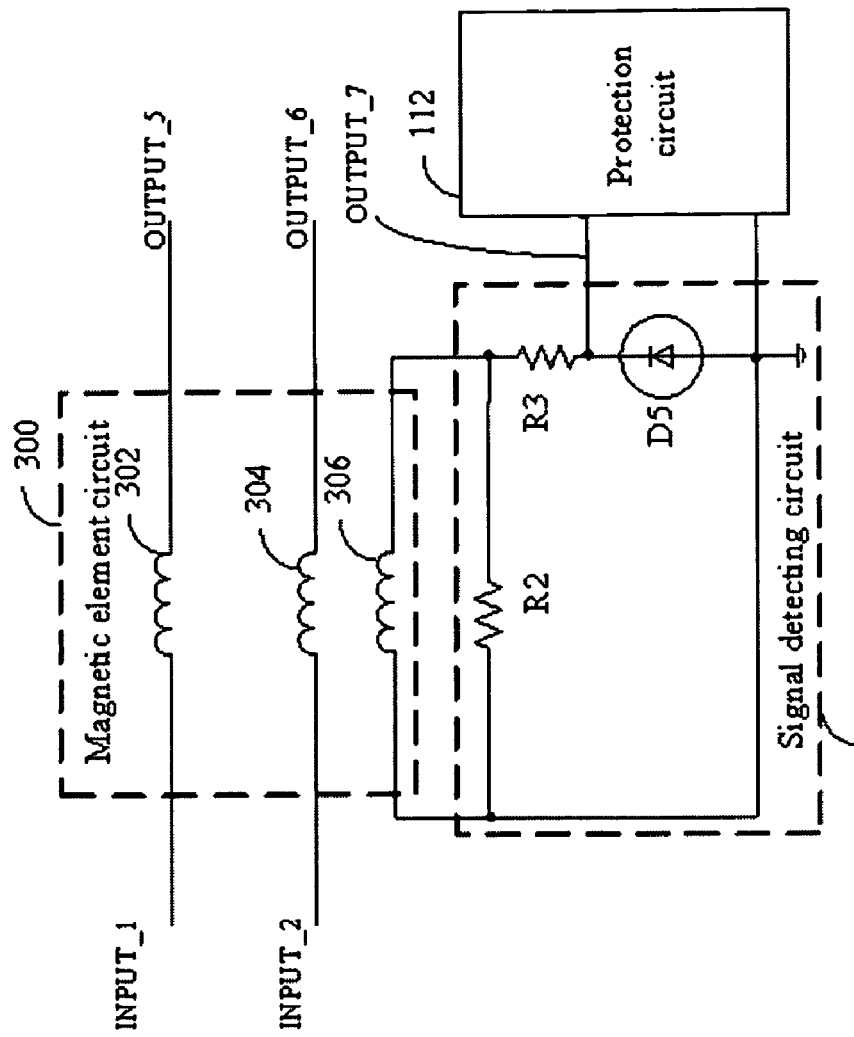
FIG. 6B is an exemplary circuit diagram of a fault detecting circuit utilizing one diode and two resistors as a rectifier circuit.
Figure 6C:
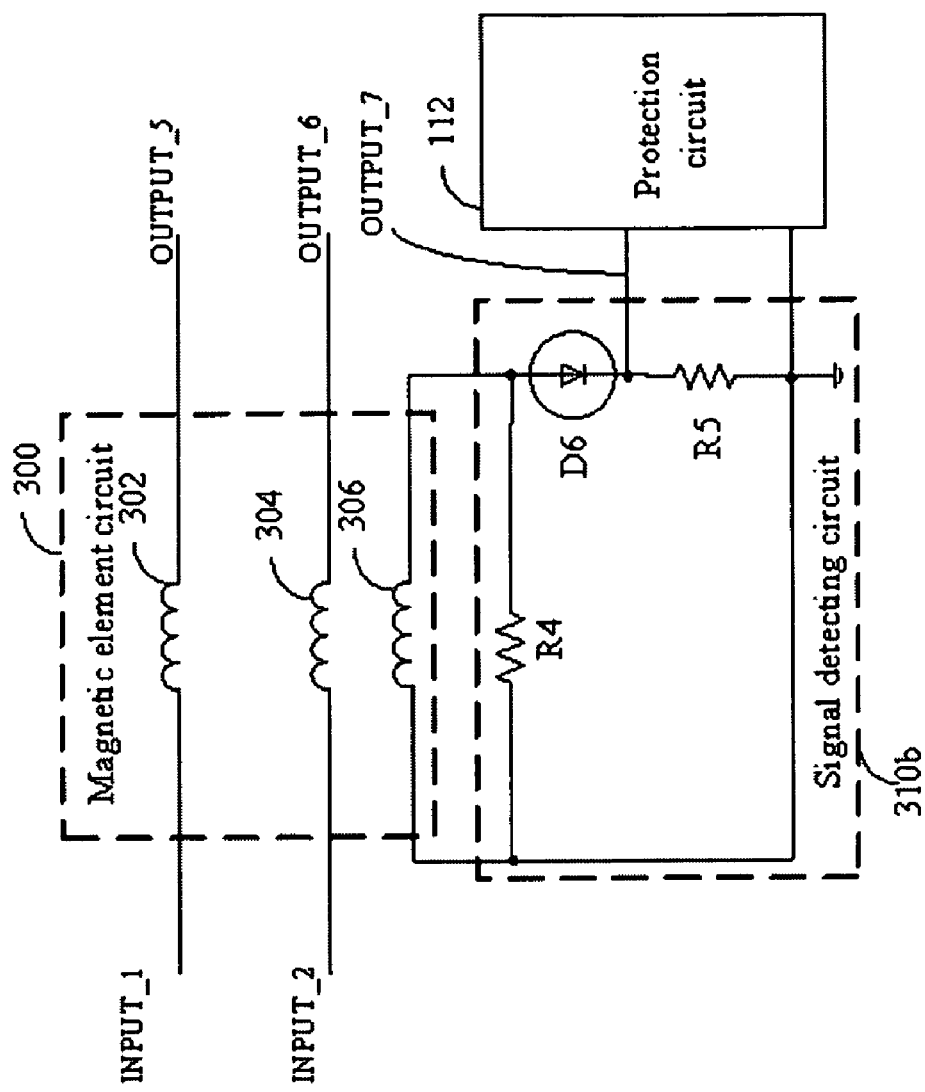
FIG. 6C is an exemplary circuit diagram of a fault detecting circuit with an alternative rectifier circuit.
Figure 6D:
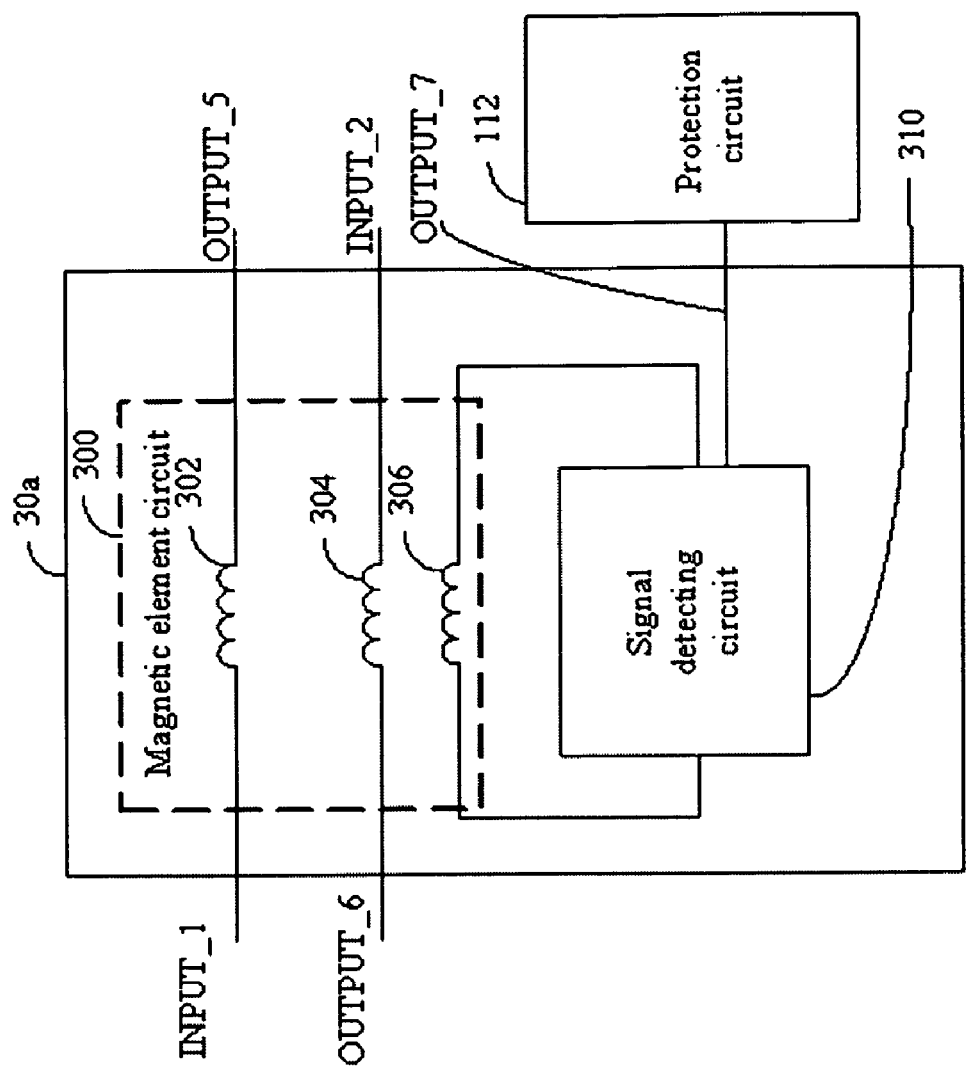
FIG. 6D is an exemplary circuit diagram of a fault detecting circuit for receiving signals of same polarity.

With reference to FIGS. 6B and 6C, a signal detecting circuit 310a and circuit 310b comprise alternative embodiments of the rectifier 312. The signal detecting circuit 310a in FIG. 6B utilizes one diode D5 and two resistors R2 and R3 as a rectifier circuit. The signal detecting circuit 310b in FIG. 6C utilizes one diode D6 and two resistors R4 and R5 as a rectifier circuit. With reference to FIG. 6D, a fault detecting circuit 30a comprises another embodiment of the fault detecting circuit 30 arranged to receive signals of same polarity.

When the lamps L operate normally, the fluxes generated by the two driving signals via the magnetic element circuit 300 counteract each other, such that the third magnetic element circuit 306 doesn't generate signals, and the signal detecting circuit 310 doesn't generate an induction signal, that is, the voltage upon the resistor R1 is kept close to zero.

When one or more lamp L is faulty, the fluxes generated by the two driving signals via the magnetic element circuit 300 do not counteract each other, triggering the third magnetic element winding 306 to generate a current signal, turning on the diodes D1 and D3 of the full-bridge rectifier 312, or the diodes D2 and D4, and the signal detecting circuit 310 generates an induction signal that is a voltage signal upon the resistor R1. Then the protecting circuit 112 takes protective actions according to the voltage signal upon the resistor R1, such as stopping the inverter circuit from operating.

Embodiments of Backlight Systems

Figure 7:
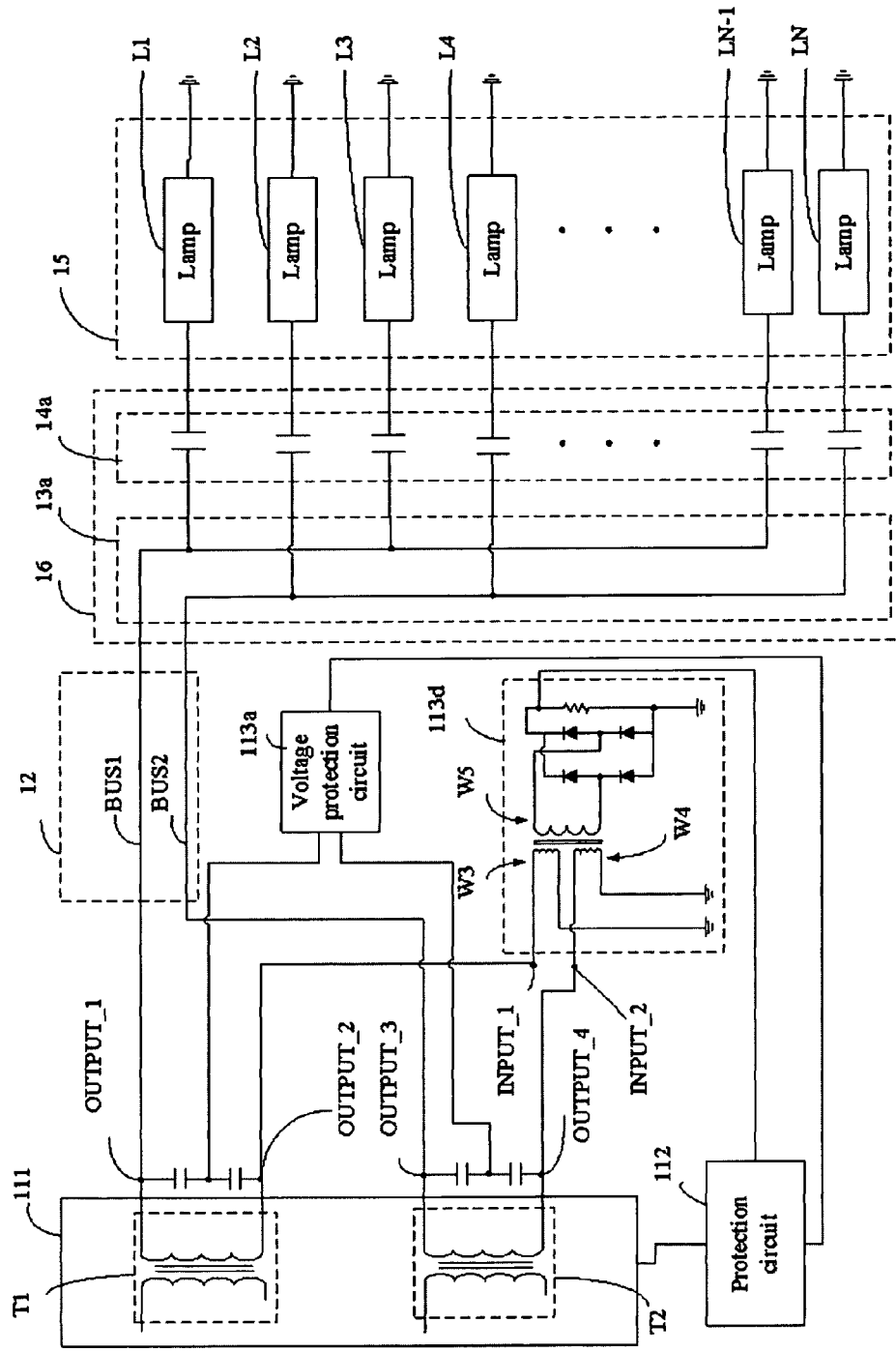
FIG. 7 is a block diagram showing another exemplary embodiment of a backlight system with magnetic elements for fault detection.

FIG. 7 shows an exemplary embodiment of the system 100B in FIG. 3. A fault detecting circuit 113d is an exemplary embodiment of the fault detecting circuit 30 in FIG. 5. The low voltage end OUTPUT_2 is connected to the winding W3 through the input INPUT_1 of the fault detecting circuit 113d. The low voltage end OUTPUT_4 is connected to the winding W4 through the input INPUT_2 of the fault detecting circuit 113d. Windings W3, W4, and W5 may be coupled through a magnetic core or not. Any fault occurring with one or more lamps L causes flux changes at the winding W5 and triggers the fault detecting circuit 113d to generate an induction signal to the protection circuit 112.

Figure 8:
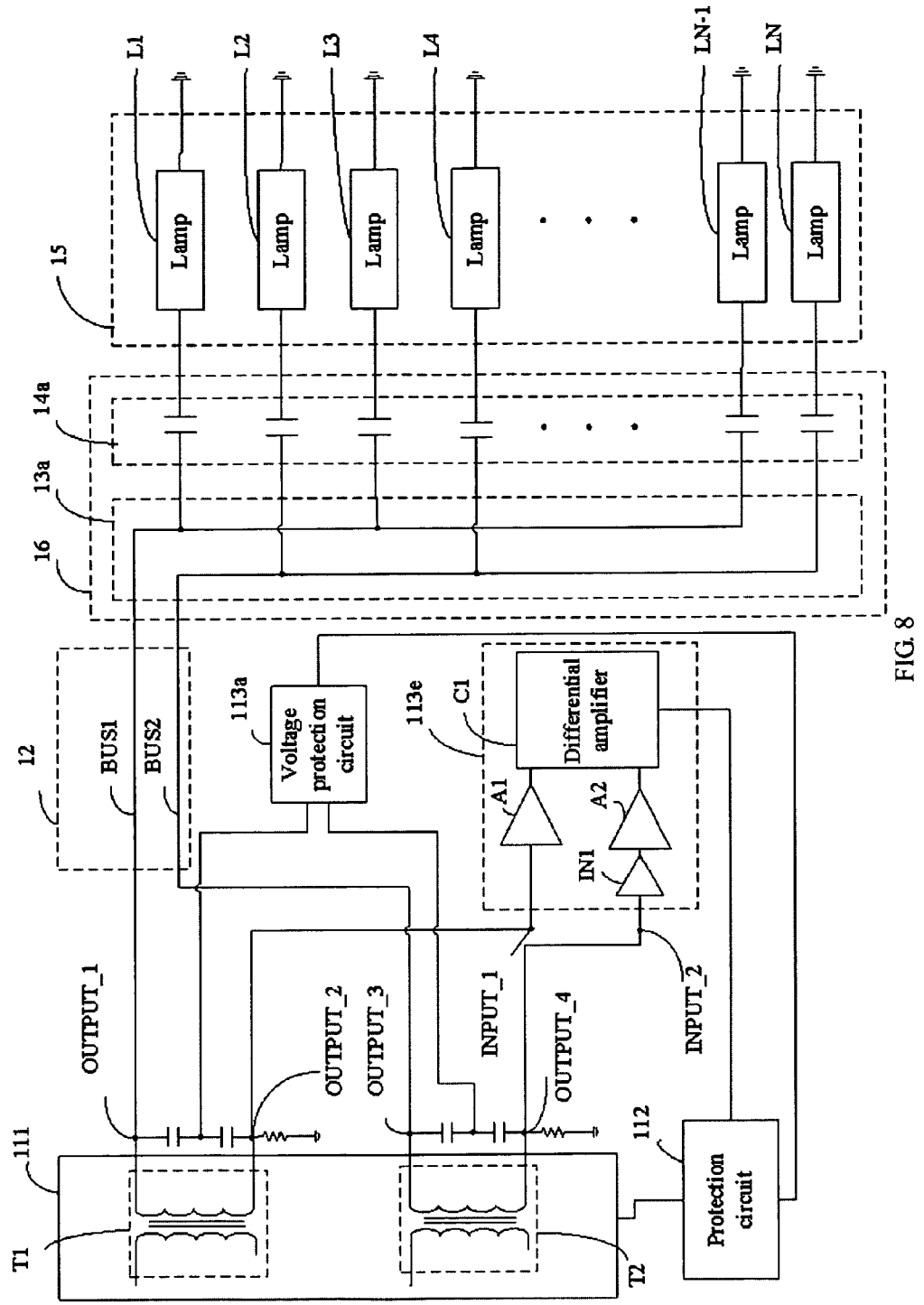
FIG. 8 is a block diagram showing another exemplary embodiment of a backlight system with differential amplifier for fault detection.

FIG. 8 shows another embodiment of the system 100B in FIG. 3. A fault detecting circuit 113e is an exemplary embodiment of the fault detecting circuit 113 in FIG. 1. The low voltage end OUTPUT_2 is connected to the input of amplifier A1 in the fault detecting circuit 113e. The low voltage end OUTPUT_4 is connected to inverter IN1, which is connected to the input of an amplifier A2 in the fault detecting circuit 113e. A differential amplifier C1 connected to the outputs of the amplifiers A1 and A2 compares signals output therefrom, and generates an induction signal to the protection circuit 112 when difference in amplitude between a signal output from the amplifier A1 and a signal output from the amplifier A2 is more than a threshold value.

Figure 9:
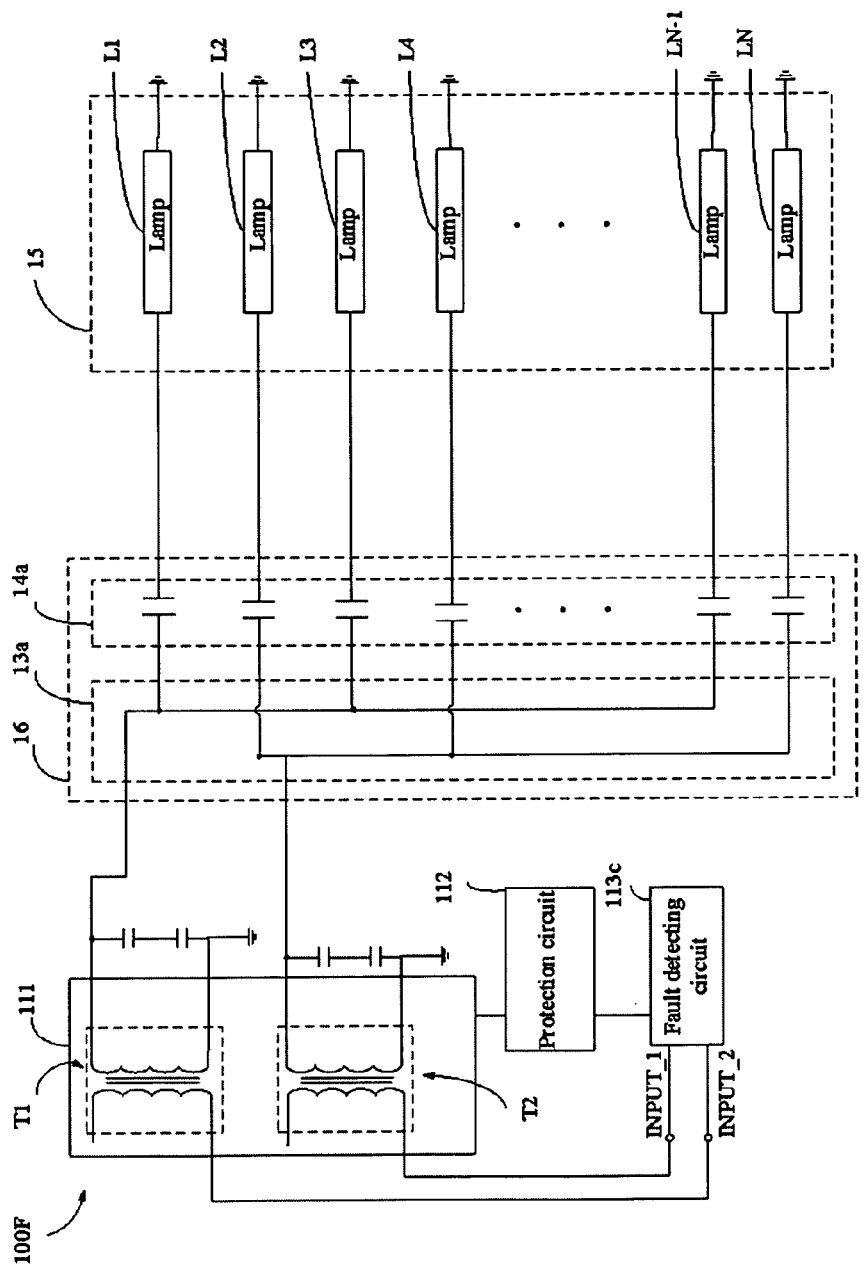
FIG. 9 is a block diagram showing another exemplary embodiment of a backlight system in which a fault detecting circuit is connected to primary windings of two transformers.

The fault detecting circuit 113c may be connected to the primary windings of at least two transformers in the inverter circuit 111. FIG. 9 shows an exemplary embodiment of the inverter circuit 111 comprising transformers T1 and T2 respectively driving two different sets of lamps in module 15. INPUT_1 and INPUT_2 of the fault detecting circuit 113c are respectively connected to one end of the primary winding of transformer T1 and one end of the primary winding of transformer T2. Note that INPUT_1 and INPUT_2 of the fault detecting circuit 113c may be connected to the low voltage or high voltage ends of these two transformers. The fault detecting circuit 113c detects current abnormalities and reports the same to the protection unit 112. When receiving the report, the protection unit 112 accordingly protects the inverter circuit 111.

Alternative Embodiments

Figure 10:
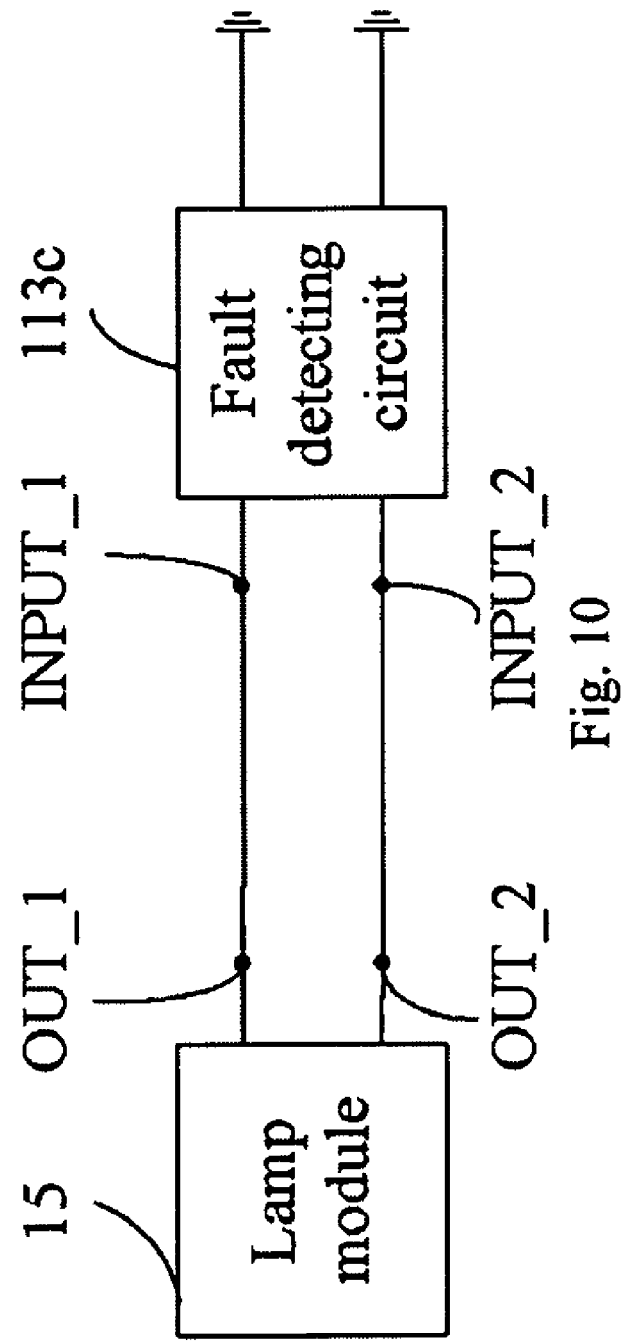
FIG. 10 is a block diagram showing an exemplary configuration of a lamp module and a fault detecting circuit.
Figure 11:
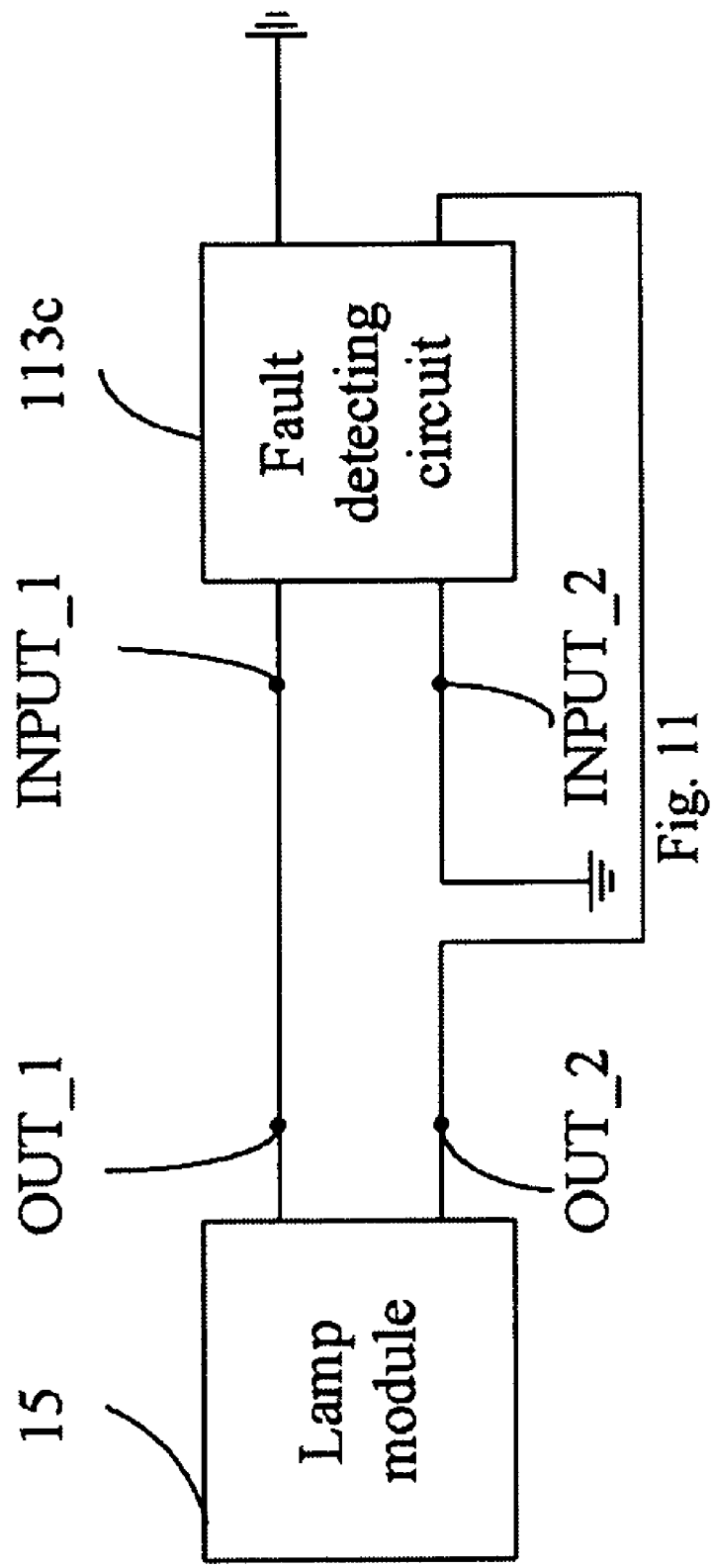
FIG. 11 is a block diagram showing another exemplary configuration of a lamp module and a fault detecting circuit.

The fault detecting circuit 113c in FIG. 3 may be utilized to detect outputs of the lamp module 15. With reference to FIG. 10, terminals OUT_1 and OUT_2 are outputs of the lamp module 15. The lamp module 15 outputs signals of opposite polarity through terminals OUT_1 and OUT_2 to the fault detecting circuit 113c. It is preferable that the lamp module 15 outputs signals of opposite polarity to the fault detecting circuit 113c, but the invention is not limited thereto. Alternatively, the lamp module 15 may output signals of same polarity. With reference to FIG. 11, the terminals OUT_1 and OUT_2 are outputs of the lamp module 15. The lamp module 15 outputs signals of same polarity through the terminals OUT_1 and OUT_2 to the fault detecting circuit 113c.

Figure 12:
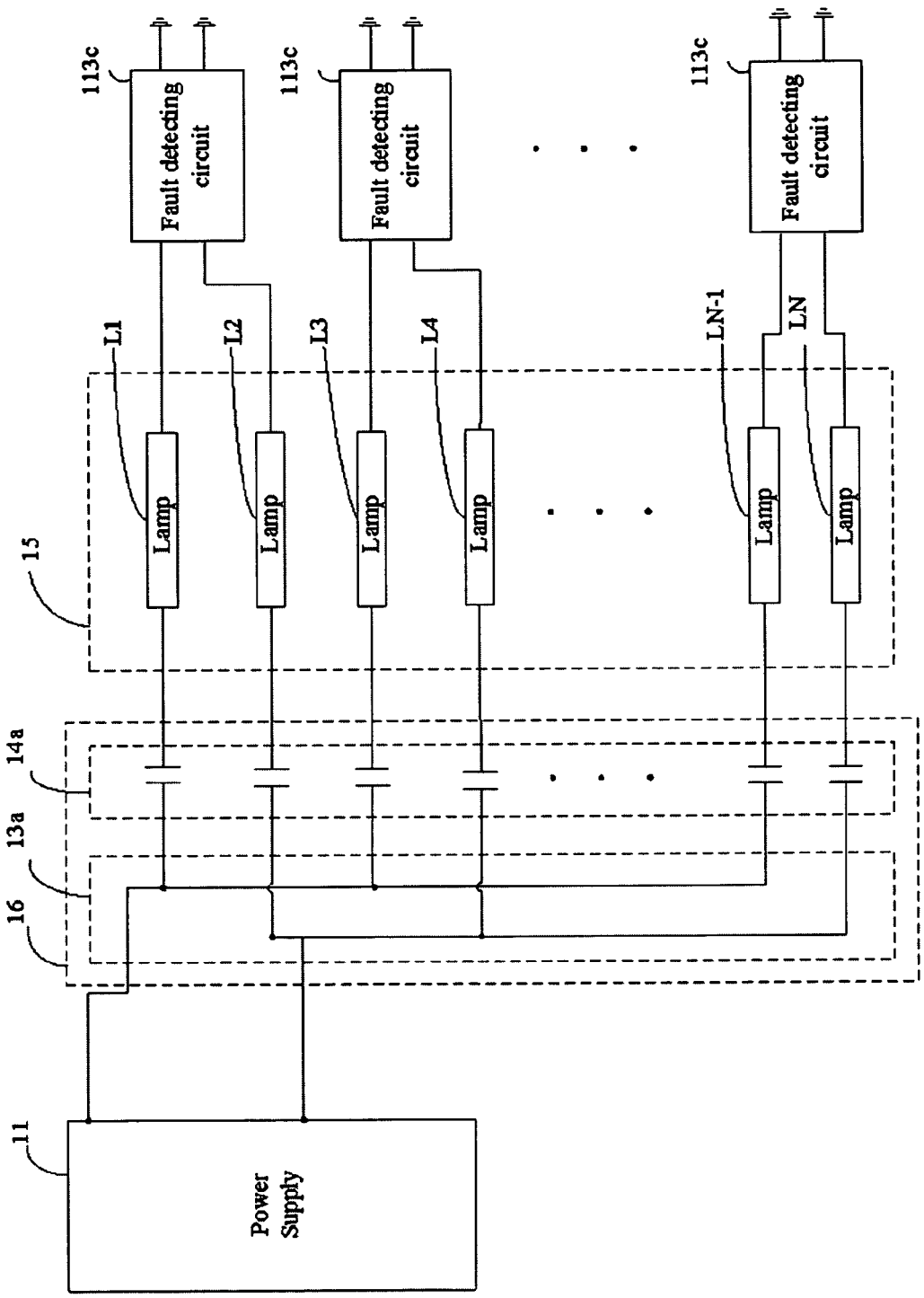
FIG. 12 is a block diagram showing another exemplary configuration of a lamp module and a fault detecting circuit, in which each lamp is connected to an input of a fault detecting circuit.
Figure 13:
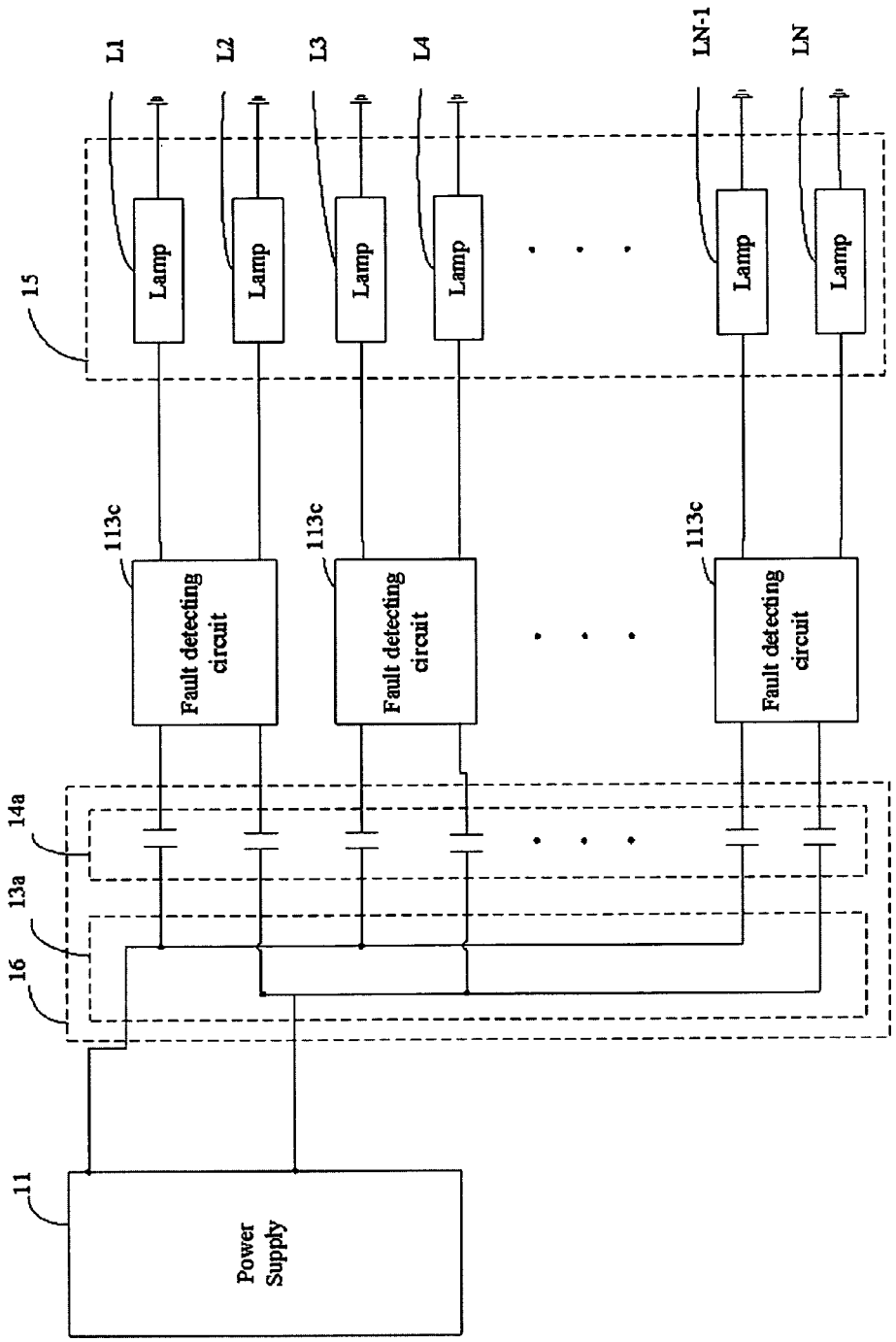
FIG. 13 is a block diagram showing another exemplary configuration of a lamp module and a fault detecting circuit, in which a fault detecting circuit is connected between a lamp module and a balance unit.
Figure 14:
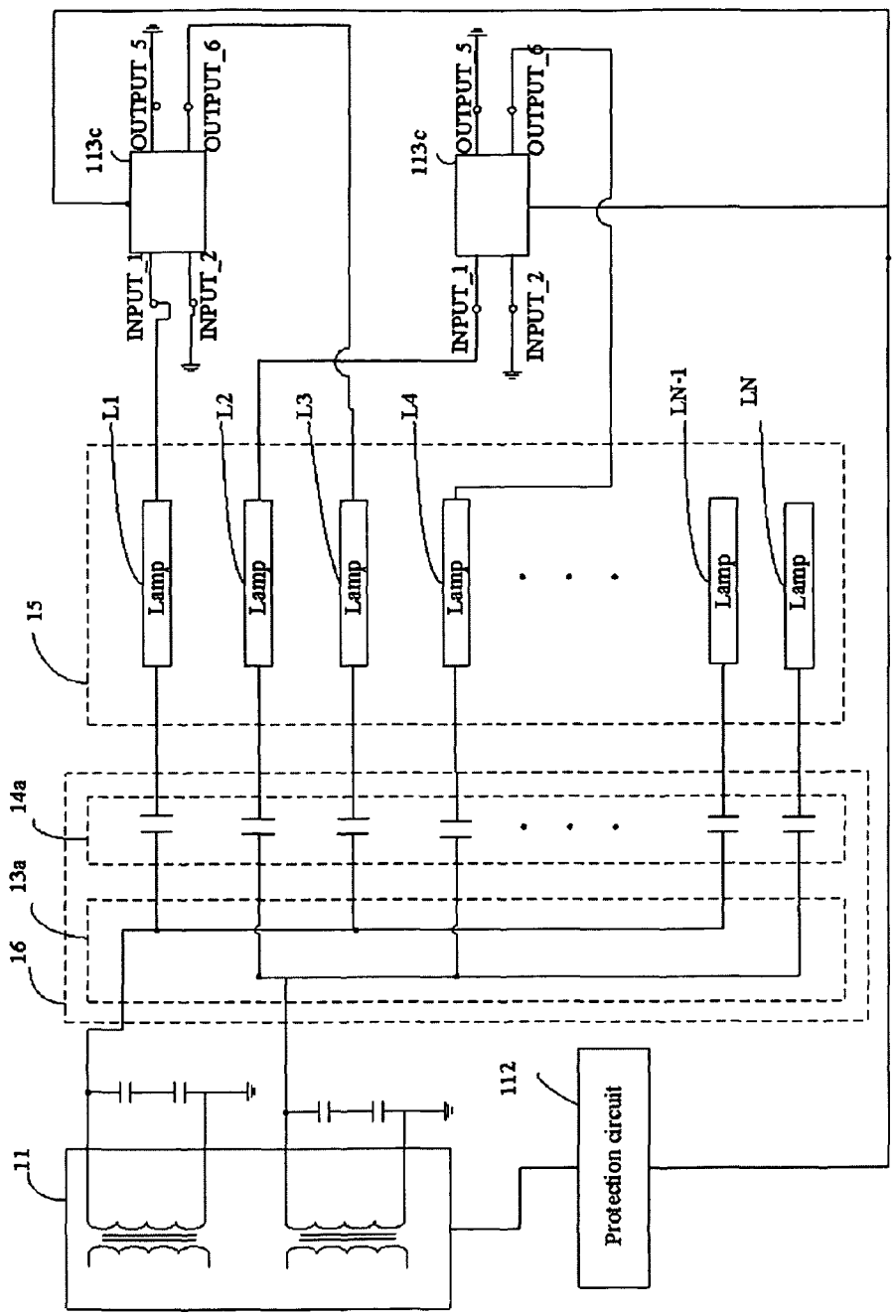
FIG. 14 is a block diagram showing another exemplary configuration of a lamp module and a fault detecting circuit, in which each lamp is connected to an input or an output of a fault detecting circuit.

Each of the terminals OUT_1 and OUT_2 may be connected to one or more lamps, as shown in FIGS. 12-14. Each input of any fault detecting circuit in FIGS. 12-14 may be connected to one or more lamps. A winding ratio between the first magnetic element winding 302 and the second magnetic element winding 304 in an exemplary embodiment of the fault detecting circuit 113c is opposite a ratio between a number of lamp outputs connected to the terminal OUT_1 and a number of lamp outputs connected to the terminal OUT_2.

Figure 18:
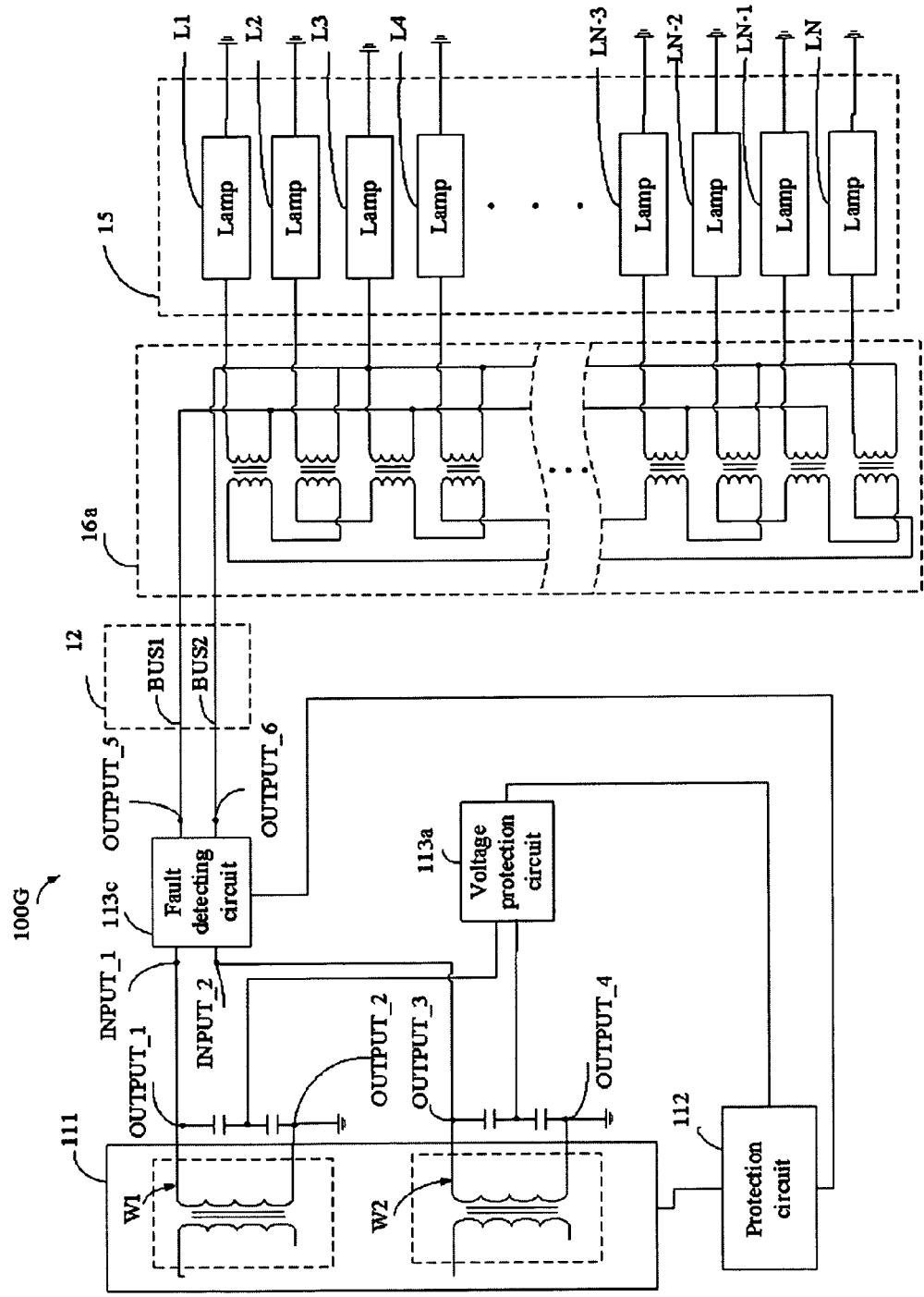
FIG. 18 is a block diagram showing an exemplary configuration of a balancing circuit board and a fault detecting circuit

A fault detecting circuit may extract signals from other components of a backlight assembly such as shown in FIG. 18. For example, the fault detecting circuit 113c extracts signals from a balancing circuit board. Each input of the fault detecting circuit may be connected to one or more outputs of the balancing circuit board. Each output of the balancing circuit board may be electrically or magnetically connected to one or more ballast elements in the balancing circuit board.

Figure 15:
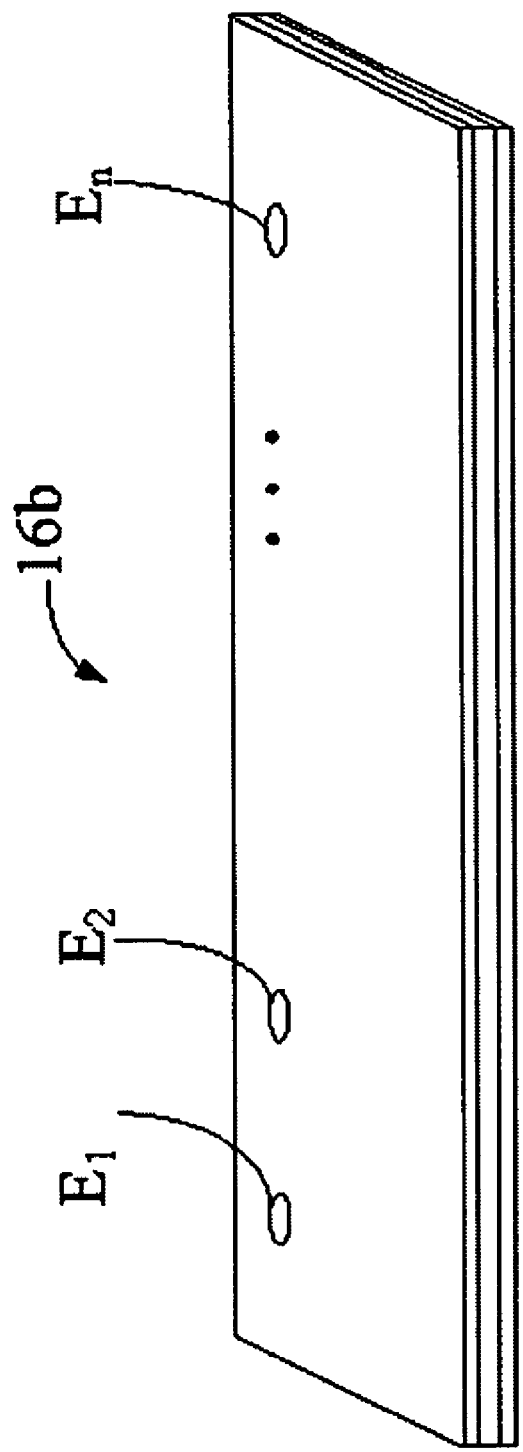
FIG. 15 is a schematic diagram showing an exemplary embodiment of a balancing circuit board.
Figure 16A:
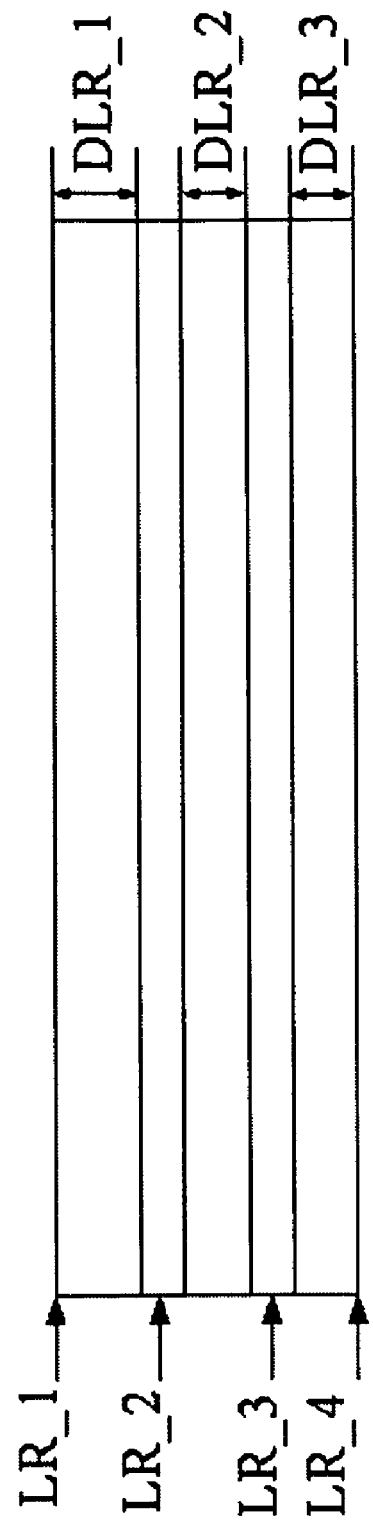
FIGS. 16A-16B are cross-sectional views of exemplary embodiments of a balancing circuit board.
Figure 16B:
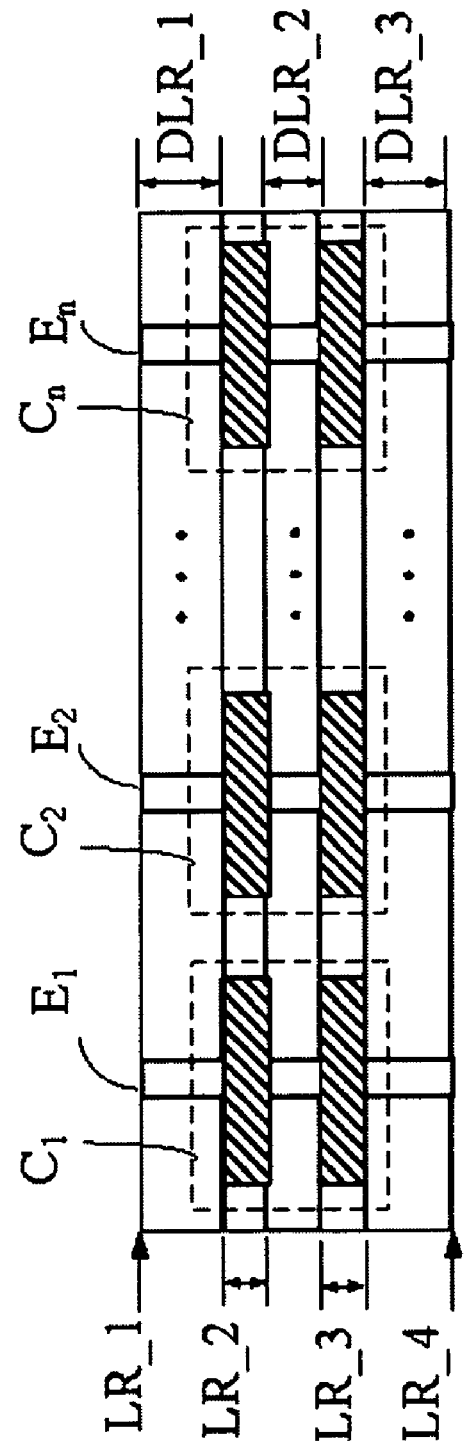

Additionally, the balance unit 14 is designed to prevent arcing. In embodiments of the balance unit 14, capacitor (C) balance, inductor (L) balance, and Jin balance circuits may be used where the C-balance circuit balances current to lamps utilizing capacitors, the L-balance circuit balances current to lamps utilizing inductors, and the Jin balance circuit balances current to lamps utilizing transformers as shown in FIG. 18. Detail of Jin balance circuit is described in US patent publication No. US 2005/0093472. Capacitors in a C-balance circuit may be surface mounted device (SMD) capacitors, or dip capacitors. In a preferred embodiment, the splitter 13 and the balance unit 14 may be integrated into a printed circuit board (PCB) on which no surface mounted device (SMD) or dip device for protecting the backlight assembly is formed. That is, no SMD or dip device is formed on the PCB except for connectors, such as connectors for connecting lamps or the interface 12. In an exemplary embodiment, the balance unit 14 comprises a plurality of capacitors formed in one or more areas of a multi-layered unified structure comprising a plurality of electrically conductive layers interlaced with dielectric substances. With reference to FIG. 15, an exemplary embodiment of the multi-layered structure comprises a multi-layered printed circuit board (PCB) 16b comprising a plurality of capacitors. The two electrodes of each capacitor are respectively formed in the PCB 16b and connected to one of vias E1, E2, . . . and En, each extending from the top surface to the bottom surface of the PCB 16b. With reference to FIGS. 16A-16B, an exemplary embodiment of the PCB 16b comprises four layers LR_1~LR_4 on which electrical conductive elements are formed. The layers LR_1~LR_4 are interlaced with dielectric layers DLR_1~DLR_3.

In FIG. 16B, each of the capacitors comprises two electrically conductive plates respectively formed on the second and third electrically conductive layers LR_2 and LR_3 of the PCB 16b for temporarily storing electrons. Two vertically adjacent plates in FIG. 16B comprise two electrodes of a capacitor (such as C1). One electrode is connected to a via (such as E1), and the other is connected to a bus connected to the inverter circuit 111. FIGS. 19A-19D show respective layers in an exemplary embodiment of the PCB 16b.

In FIGS. 19A-19D, each of vias 191~198 and 191A~196A extends from the top outer surface of the layer LR_1 through LR_2, LR_3 to the outer surface of the layer LR_4 of the exemplary embodiment of the PCB 16b. Each via may be made up of electrically conductive material filling through-holes on the layers LR_1~LR_4. Vias (such as the vias 191~196) may be respectively strengthened by rivets extending through the through-holes. The buses 121 and 122 of the interface 12 may be respectively connected to via 197 and via 198. Each of vias 191-196 may be connected to a lamp in the module 15. When signals conveyed by the buses 121 and 122 are of opposite polarity, any two neighboring vias respectively connected to the vias 197 and 198 may provide signals of opposite polarity to lamps.

Figure 19A:
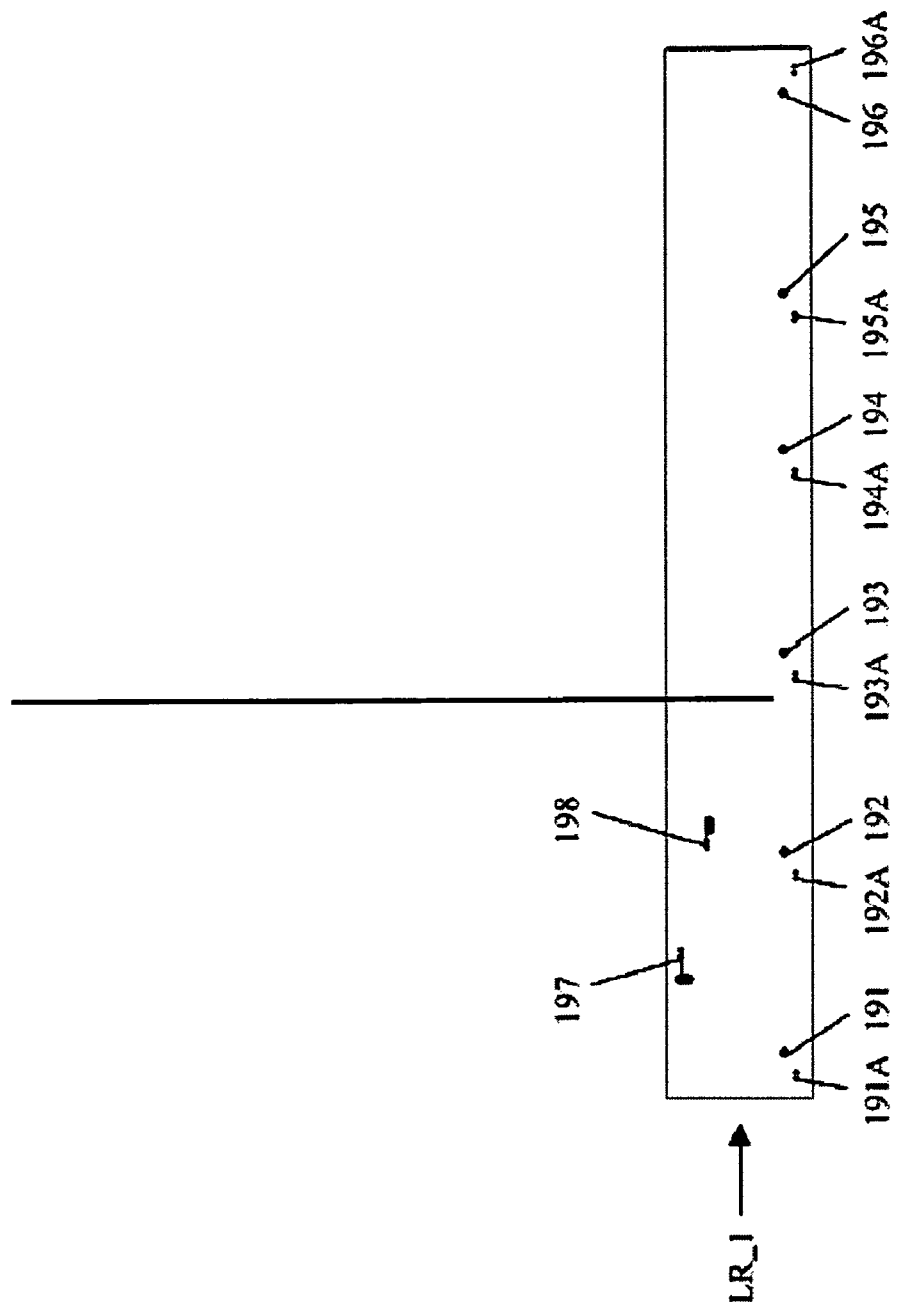
FIGS. 19A-19D are schematic diagrams showing respective layers in an exemplary embodiment of a balance unit.

In FIG. 19A, the top layer LR_1 of the exemplary embodiment of the PCB 16b may comprise no SMD or dip device other than connectors.

Figure 19B:
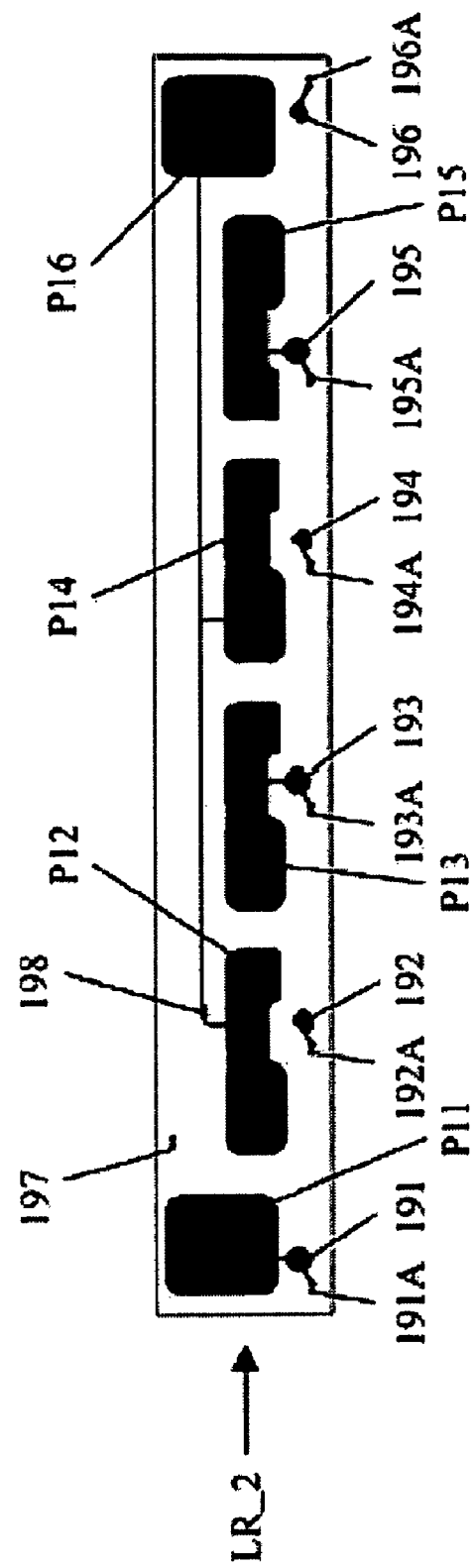

In FIG. 19B, the second layer LR_2 of the exemplary embodiment of the PCB 16b comprises electrically conductive plates P11, P12, P13, P14, P15, and P16. The plates may comprise printed copper foils. As shown, each plate may comprise two areas connected to each other through a narrow trace. Plates P11, P13, and P15 are respectively connected to vias 191, 193, and 195 while plates P12, P14, and P16 are all connected to the via 198. The vias 191A-196A are respectively redundant vias connected to the vias 191-196.

Figure 19C:
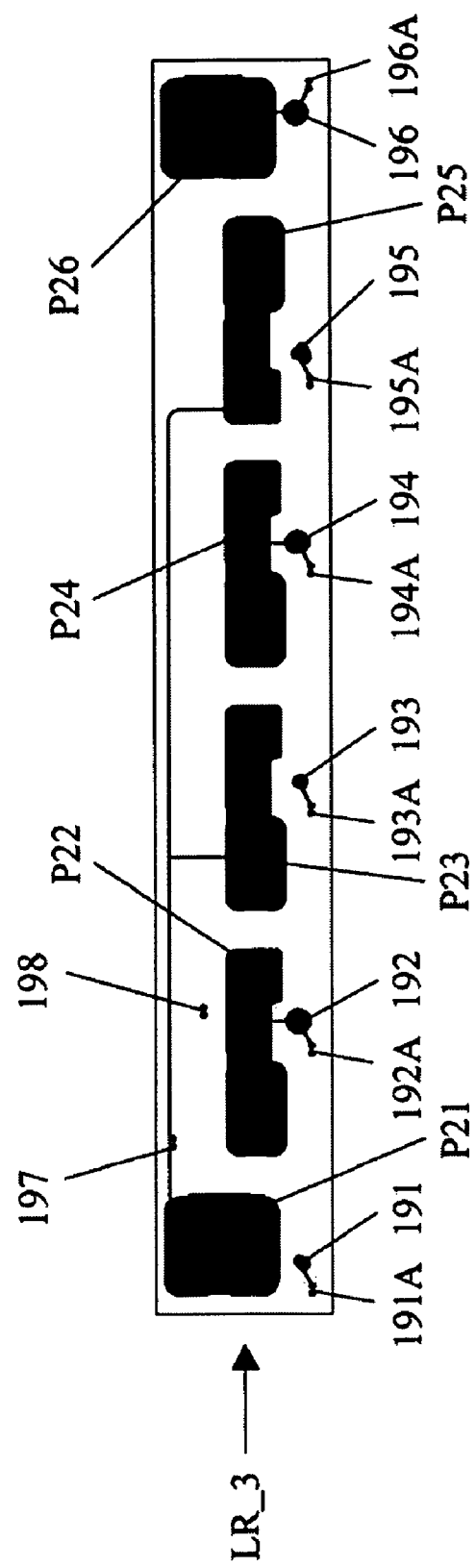

In FIG. 19C, the third layer LR_3 of the exemplary embodiment of the PCB 16b comprises electrically conductive plates P21, P22, P23, P24, P25, and P26. The plates may comprise printed copper foils. Plates P21, P23, and P25 are all connected to the via 197 while plates P22, P24, and P26 are respectively connected to vias 192, 194, and 196.

Figure 19D:
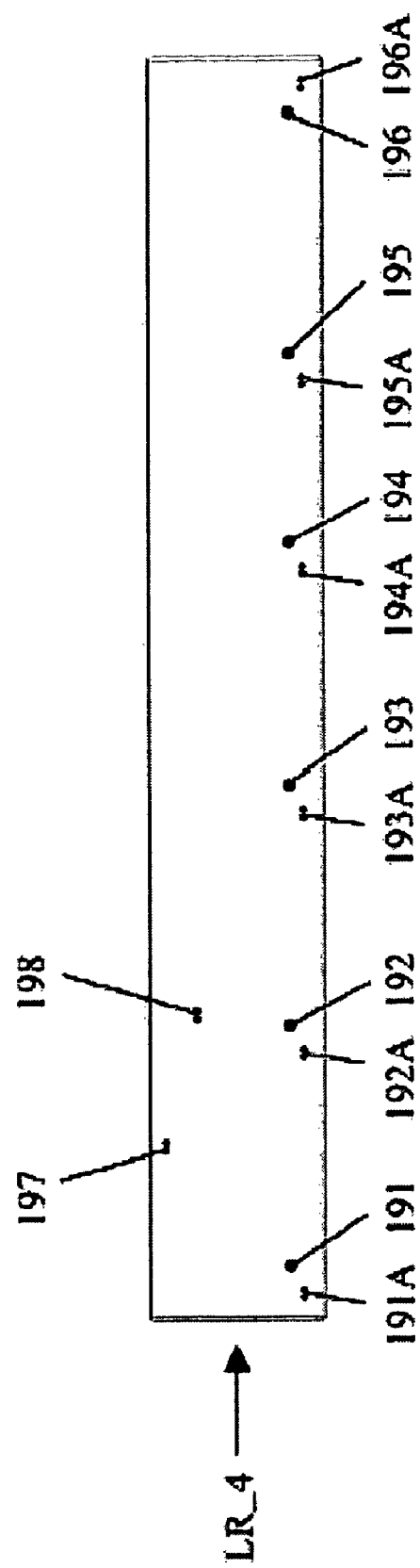

In FIG. 19D, the bottom layer LR_4 of the exemplary embodiment of the PCB 16b may comprise no SMD or dip device. Vias 197, 198 and tracks in FIGS. 19A-19D comprise an exemplary embodiment of the splitter 13.

Electrodes of different capacitors connected to the same bus may be located in different layers. FIGS. 20A-20D show respective layers in another exemplary embodiment of the PCB 16b.

In FIGS. 20A-20D, each of the vias 201-209 and 201A-206A extends from the top outer surface of the layer LR_1 through LR_2, LR_3 to the outer surface of the layer LR_4 of the exemplary embodiment of the PCB 16b. Each via may be made up of electrically conductive material filling through-holes on the layers LR_1~LR_4. Vias (such as the vias 191~196) may be respectively strengthened by rivets extending through the through-holes. The buses 121 and 122 of the interface 12 may be respectively connected to the via 207 and the via 208. Each of vias 201-206 may be connected to a lamp in the module 15. When signals conveyed by the buses 121 and 122 are of opposite polarity, any two neighboring vias respectively connected to the vias 207 and 208 may provide the signals of opposite polarity to lamps.

Figure 20A:
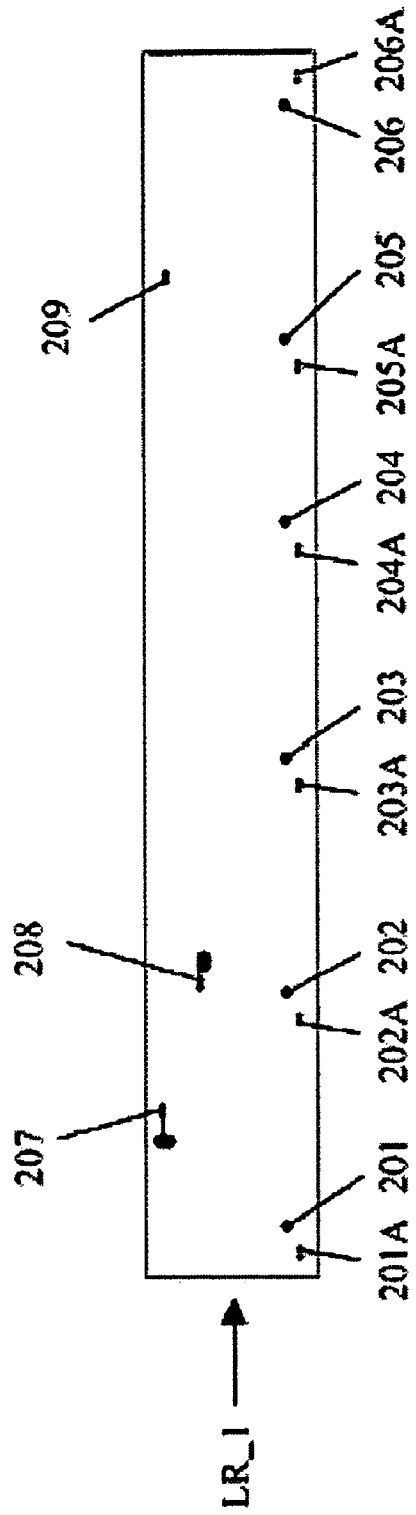
FIGS. 20A-20D are schematic diagrams showing respective layers in another exemplary embodiment of a balance unit.

In FIG. 20A, the top layer LR_1 of the exemplary embodiment of the PCB 16b may comprise no SMD or dip device.

Figure 20B:
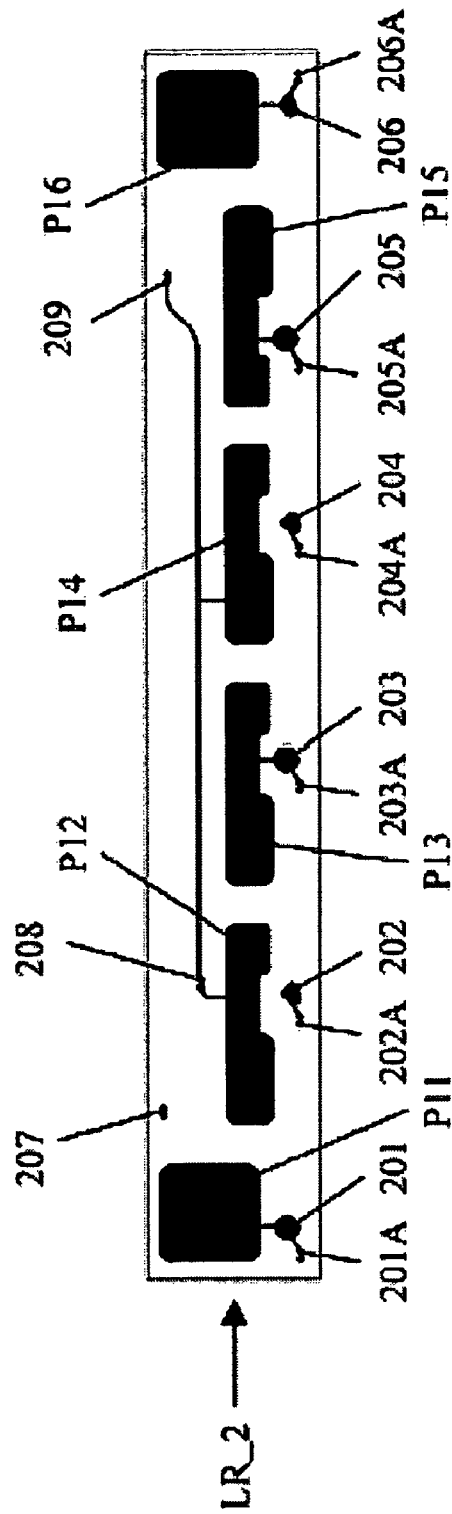

In FIG. 20B, the second layer LR_2 of the exemplary embodiment of the PCB 16b comprises electrically conductive plates P11, P12, P13, P14, P15, and P16. The plates may comprise printed copper foils. Plates P11, P13, P15, and P16 are respectively connected to vias 201, 203, 205, and 206 while plates P12 and P14 are connected to via 208 and via 209. The vias 201A-206A are respectively redundant vias connected to the vias 201-206.

Figure 20C:
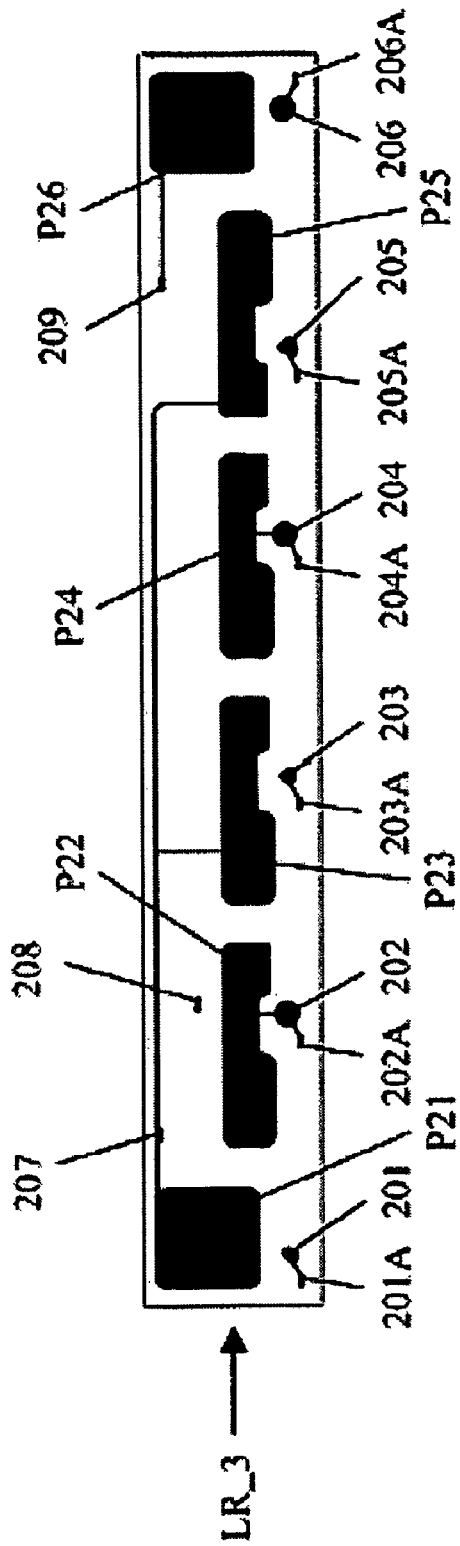

In FIG. 20C, the third layer LR_3 of the exemplary embodiment of the PCB 16b comprises electrically conductive plates P21, P22, P23, P24, P25, and P26. The plates may comprise printed copper foils. Plates P21, P23, and P25 are all connected to via 207 while plates P22 and P24 are respectively connected to vias 202 and 204. Plate P26 is connected to via 209.

Figure 20D:
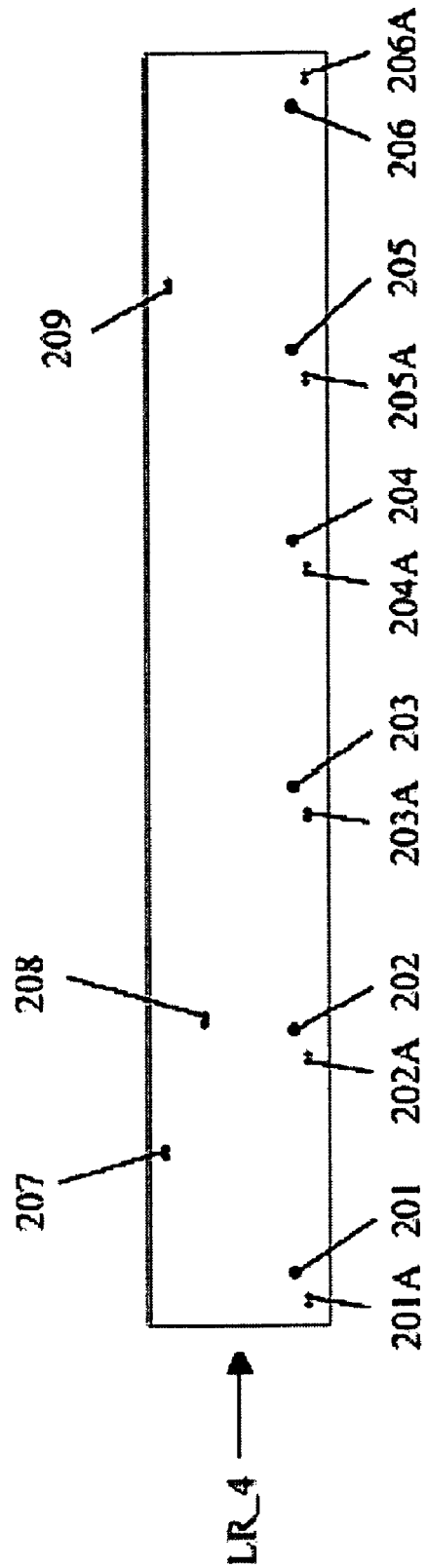

In FIG. 20D, the bottom layer LR_4 of the exemplary embodiment of the PCB 16b may comprise no SMD or dip device. Vias 207, 208, 209 and tracks in FIGS. 20A-20D comprise an exemplary embodiment of the splitter 13.

Figure 17:
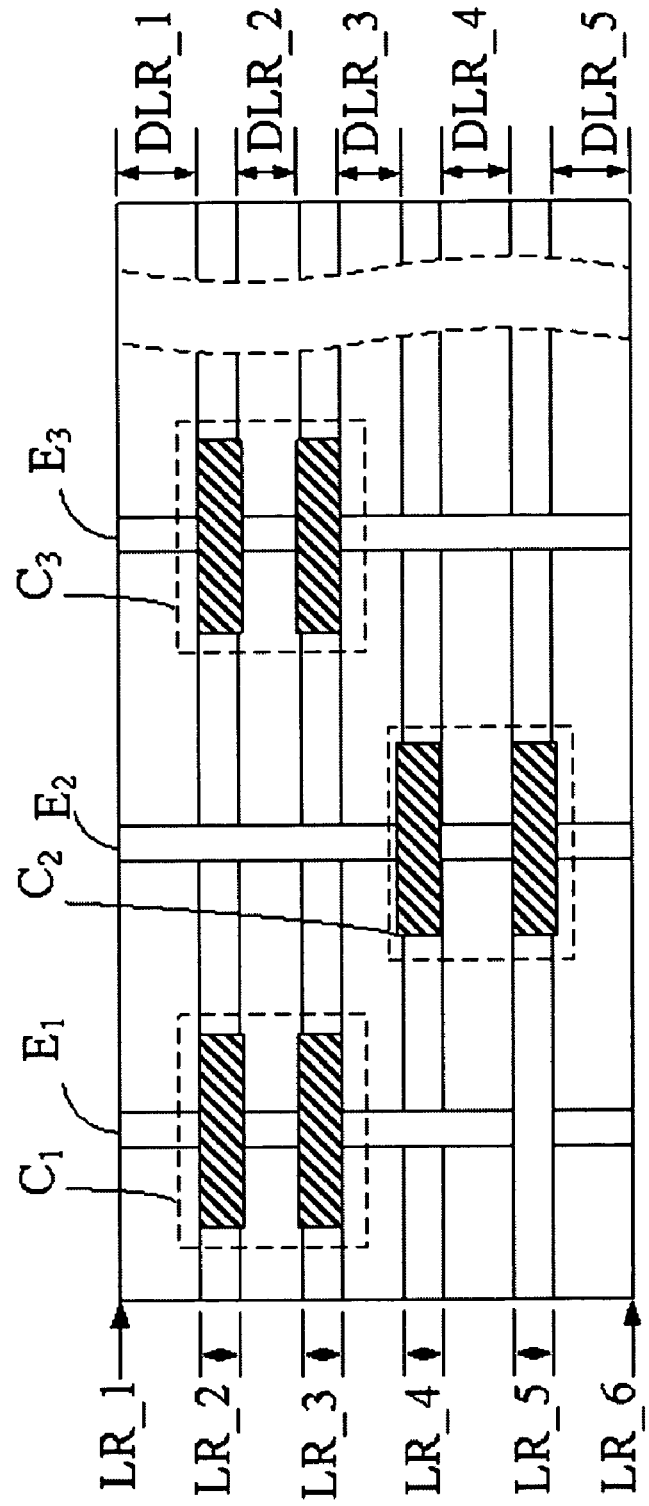
FIG. 17 is a cross-sectional view of an exemplary embodiment of a balancing circuit board.

Note that the balance unit 14 is not limited to the PCB 16b with four electrically conductive layers. For example, FIG. 17 shows another exemplary embodiment of the balance unit 14 comprising capacitors C1, C2, C3, . . . and Cn. Electrodes of the capacitors are formed in layers LR_2~LR_5. Electrodes of two adjacent capacitors are formed in different layers.

CONCLUSION

As a consequence, the proposed system may detect faults on at least one lamp regardless of affects by lamp age or status of lamps. Various fault detecting circuits may be incorporated into the system in various configurations. Additionally, the system may utilize a multilayered PCB as a balance unit for balancing current.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A system for driving a plurality of lamps in a lamp module, comprising:
    an inverter circuit providing power to the plurality of lamps of the lamp module;
    an interface for conveying the power;
    a splitter receiving the power provided by the inverter circuit through the interface and distributing the power to the plurality of lamps;
    a balance unit balancing current portion in the power provided to the plurality of lamps of the lamp module; and
    a fault detecting circuit detecting and reporting a condition of at least one of the lamps by detecting signals generated from the inverter circuit before the signals undergo the distribution by the splitter.

2. The system of claim 1, wherein the signals comprise current generated from the inverter circuit.

3. The system of claim 1, wherein the signals comprise two driving signals, the inverter circuit generates currents as the two driving signals for respectively driving two sets of the lamps in the lamp module, the fault detecting circuit detects variance of one of the two driving signal caused by the at least one of the lamps with reference to the other of the two driving signal, thus to report the condition of the at least one of the lamps.

4. The system of claim 3, wherein the two driving signals are of opposite polarity.

5. The system of claim 3, wherein the fault detecting circuit comprises:
    a magnetic element circuit for generating an induction signal according to flux changes thereof generated from the two driving signals.

6. The system of claim 5, wherein the magnetic element circuit comprises:
    a first magnetic element winding connected to one of the two driving signal and one of the two sets of the lamps;
    a second magnetic element winding connected to the other of the two driving signal and the other of the two sets of the lamps; and
    a third magnetic element winding for generating the induction signal according to the flux changes thereof generated from the two driving signals.

7. The system of claim 6, wherein a winding ratio between the first magnetic element winding and the second magnetic element winding is substantially reverse to a ratio between current provided by the inverter circuit to one of the two sets of the lamps and current provided by the inverter circuit to the other of the two sets of the lamps.

8. The system of claim 3, wherein the fault detecting circuit comprises:
    a differential amplifier for generating an induction signal according to difference between respective amplitudes of the two driving signals at the same time.

9. The system of claim 1, wherein the fault detecting circuit is connected to the secondary winding of a transformer in the inverter circuit, and detects a portion of the signals from a low voltage end or a high voltage end of the secondary winding of the transformer in the inverter circuit.

10. The system of claim 1, wherein the fault detecting circuit is connected to the primary winding of a transformer in the inverter circuit, and detects a portion of the signals from the primary winding of the transformer in the inverter circuit.

11. The system of claim 1, wherein the signals comprise current portion in the power conveyed by the interface, and the fault detecting circuit is connected to the interface to extract the signals therefrom.

12. The system of claim 1, wherein the balance unit comprises a plurality of capacitors formed in a multi-layered unified structure comprising a plurality of electrically conductive layers interfaced by dielectric substances, and the number of the electrically conductive layers is not less than four.

13. The system of claim 12, wherein each of the capacitors comprises two electrically conductive plates respectively formed on the second and third electrically conductive layers of the multi-layered unified structure.

14. The system of claim 12, wherein each of the capacitors comprises two electrically conductive plates as electrodes thereof, and electrodes of two adjacent capacitors are respectively formed on different electrically conductive layers of the multi-layered unified structure.

15. The system of claim 1, wherein the splitter and the balance unit are integrated on a printed circuit board (PCB) on which no surface mounted device or dip device is formed for protecting the system.

16. A system for driving a plurality of lamps in a lamp module comprising a plurality of outputs, wherein the plurality of outputs are divided into a first output part and a second output part, comprising:
a fault detecting circuit for detecting one or more of the plurality of outputs of the lamp module, wherein the fault detecting circuit further comprises:
a magnetic element circuit for generating an induction signal according to flux changes thereof generated from the first output part and the second output part.

17. The system of claim 16, wherein the magnetic element circuit comprises:
a first magnetic element winding connected to the first output part;
a second magnetic element winding connected to the second output part; and
a third magnetic element winding for generating the induction signal according to the flux changes thereof generated from the first output part and the second output part.

18. The system of claim 17, wherein a winding ratio between the first magnetic element winding and the second magnetic element winding is reverse to a ratio between a number of outputs of the first output part and a number of outputs of the second output part.

19. The system of claim 16, further comprising:
a power supply providing currents to the lamp module; and
a balance unit for balancing currents respectively provided to the plurality of lamps in the lamp module, wherein the balance unit comprises a plurality of capacitors formed in a multi-layered unified structure comprising a plurality of electrically conductive layers interfaced by dielectric substances, and the number of the electrically conductive layers is not less than four.

20. The system of claim 19, wherein each of the capacitors comprises two electric conductive plates respectively formed on the second and third electrically conductive layers of the multi-layered unified structure.

21. A system for driving a plurality of lamps in a lamp module, comprising:
an inverter circuit providing driving signals to the plurality of lamps of the lamp module; and
a fault detecting circuit for detecting a condition of at least one of the plurality of the lamps of the lamp module by comparing a first portion of the driving signals provided to a first set of the lamps with a second portion of the driving signals provided to a second set of the lamps.

22. The system of claim 21, wherein the fault detecting circuit comprises a magnetic element circuit for generating an induction signal according to flux changes thereof generated from the first portion and the second portion of the driving signal.

23. The system of claim 21, wherein the magnetic element circuit comprises:
a first magnetic element winding connected to the first portion of the driving signals;
a second magnetic element winding connected to the second portion of the driving signals; and
a third magnetic element winding for generating the induction signal according to the flux changes thereof generated from the first portion and the second portion of the driving signals.

24. The system of claim 23, wherein a winding ratio between the first magnetic element winding and the second magnetic element winding is reverse to a ratio between amplitude of the first portion and amplitude of the second portion of the driving signals at the same time.

25. The system of claim 21, further comprising:
a balance unit balancing the driving signals provided to the plurality of lamps of the lamp module, wherein the fault detecting circuit extracts the first portion and the second portion of the driving signals from the balance unit, the inverter circuit, or the lamp module.

* * * * *